(12) United States Patent
Kurokami et al.

(10) Patent No.: US 10,570,587 B2
(45) Date of Patent: Feb. 25, 2020

(54) PERIPHERY MONITORING DEVICE OF WORK MACHINE

(71) Applicant: HITACHI CONSTRUCTION MACHINERY CO., LTD., Tokyo (JP)

(72) Inventors: Kazushige Kurokami, Namegata (JP); Hiroshi Sakamoto, Hitachi (JP); Mariko Mizuochi, Hitachinaka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/331,309

(22) PCT Filed: Nov. 2, 2017

(86) PCT No.: PCT/JP2017/039789
§ 371 (c)(1),
(2) Date: Mar. 7, 2019

(87) PCT Pub. No.: WO2018/179560
PCT Pub. Date: Oct. 4, 2018

(65) Prior Publication Data
US 2019/0352885 A1    Nov. 21, 2019

(30) Foreign Application Priority Data

Mar. 31, 2017    (JP) ................. 2017-069559

(51) Int. Cl.
*B60Q 1/00* (2006.01)
*E02F 9/26* (2006.01)
(Continued)

(52) U.S. Cl.
CPC .............. *E02F 9/261* (2013.01); *B60Q 5/006* (2013.01); *B60Q 9/008* (2013.01); *B60R 1/00* (2013.01);
(Continued)

(58) Field of Classification Search
None
See application file for complete search history.

(56) References Cited

U.S. PATENT DOCUMENTS 6,744,372 B1 * 6/2004 Shaw ................. B66C 13/44
212/276
6,985,085 B1 * 1/2006 Brown ................. B66C 15/065
212/276

(Continued)

FOREIGN PATENT DOCUMENTS

JP    2000-344165 A    12/2000
JP    2006-027481 A    2/2006
(Continued)

OTHER PUBLICATIONS

International Search Report of PCT/JP2017/039789 dated Dec. 12, 2017.

(Continued)

*Primary Examiner* — Adolf Dsouza
(74) *Attorney, Agent, or Firm* — Mattingly & Malur, PC

(57) ABSTRACT

Provided is a controller (50) that includes a mechanical state acquisition section (400) that acquires information regarding a posture and an operation of a hydraulic excavator; a blind angle calculation section (500) that calculates a blind angle area from a seat in a cab (1*f*) of the hydraulic excavator based on the information indicating the posture and the operation of the hydraulic excavator and acquired by the mechanical state acquisition section (400); and a visibility level determination section (300) that determines a visibility level of an obstacle based on the blind angle area calculated by the blind angle calculation section (500) and a positional relationship calculated by a position relation calculation section (200). Further, a warning level determination section (600) of the controller (50) adjusts a warning level in (Continued)

accordance with the visibility level determined by the visibility level determination section (300).

6 Claims, 19 Drawing Sheets

(51) Int. Cl.
    *B60Q 9/00*      (2006.01)
    *B60R 1/00*      (2006.01)
    *B60Q 5/00*      (2006.01)

(52) U.S. Cl.
    CPC . *B60R 2300/107* (2013.01); *B60R 2300/8046* (2013.01); *B60R 2300/8093* (2013.01)

(56) References Cited

U.S. PATENT DOCUMENTS

| | | | |
|---|---|---|---|
| 9,269,255 B2* | 2/2016 | Beaulieu | B66C 13/40 |
| 9,409,519 B2 | 8/2016 | Sisbot et al. | |
| 9,442,194 B2* | 9/2016 | Kurihara | G01S 13/86 |
| 2002/0175824 A1* | 11/2002 | Shaw | B66C 13/44 |
| | | | 340/685 |
| 2015/0183370 A1* | 7/2015 | Nakanishi | E02F 9/261 |
| | | | 348/148 |

FOREIGN PATENT DOCUMENTS

| | | |
|---|---|---|
| JP | 2008-026159 A | 2/2008 |
| JP | 2010-173619 A | 8/2010 |
| JP | 2010-198519 A | 9/2010 |
| JP | 2014-064144 A | 4/2014 |
| JP | 2016-211149 A | 12/2016 |

OTHER PUBLICATIONS

Notification Concerning Documents Transmitted received in corresponding International Application No. PCT/JP2017/039789 dated Apr. 29, 2019.

* cited by examiner

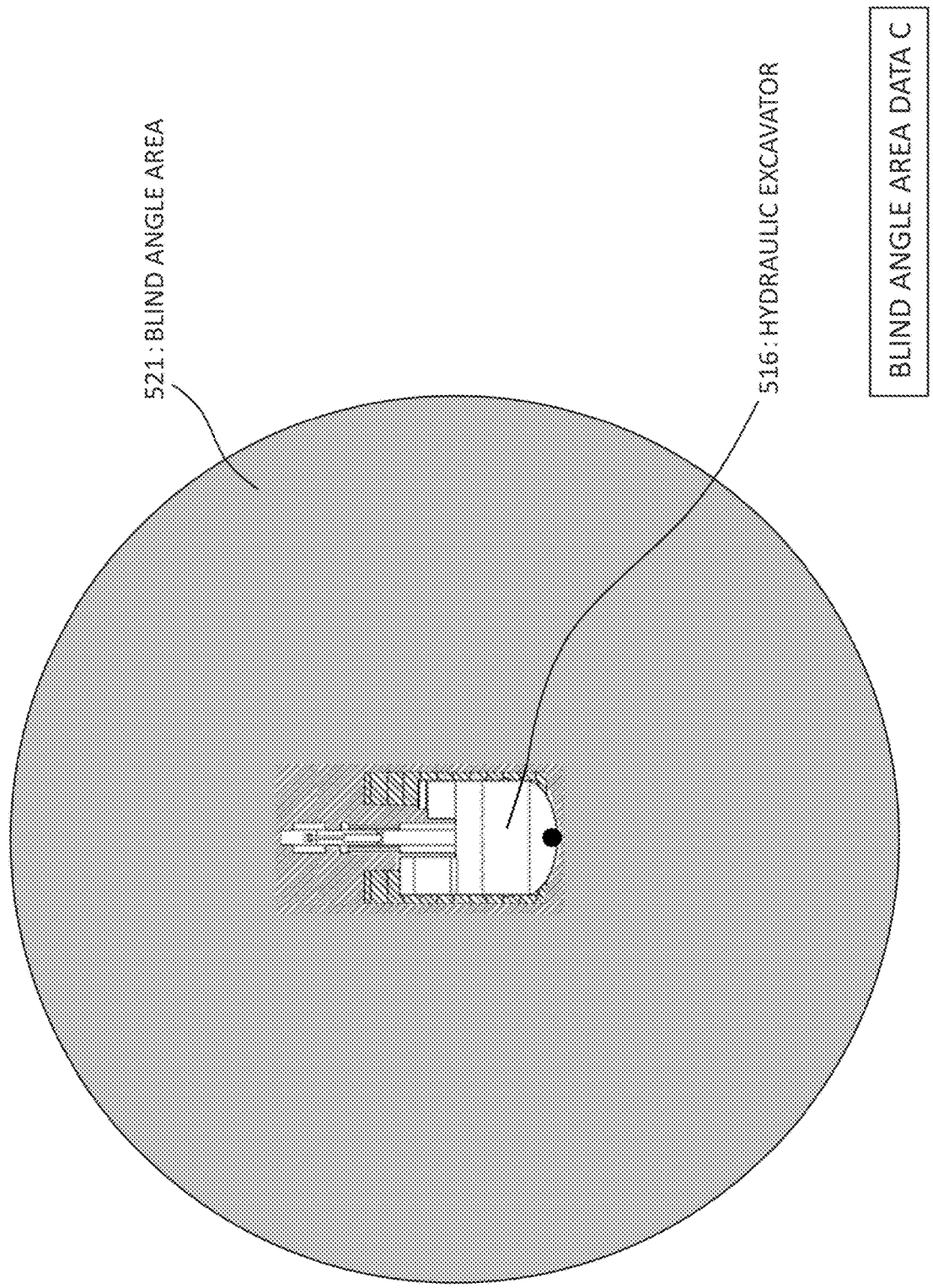

FIG. 6

| OPERATION BY OPERATOR | GAZE DIRECTION OF OPERATOR | NOTE |
|---|---|---|
| FRONT (EXCAVATION) | FRONT CLAW TIP POSITION | — |
| RIGHT SWING | RIGHT FRONT OF MACHINE BODY | — |
| LEFT SWING | LEFT FRONT OF MACHINE BODY | — |
| TRAVELING (STRAIGHT: FORWARD) | FRONT OF MACHINE BODY FRONT | — |
| TRAVELING (STRAIGHT: BACKWARD) | VISION ASSIST DEVICE | DISPLAY IMAGE ACQUIRED BY STEREO CAMERA 13a |
| TRAVELING (OTHERS) | — | POSSIBILITY OF VIEWING IN RESPECTIVE DIRECTIONS |
| NO OPERATION | — | POSSIBILITY OF VIEWING IN RESPECTIVE DIRECTIONS |

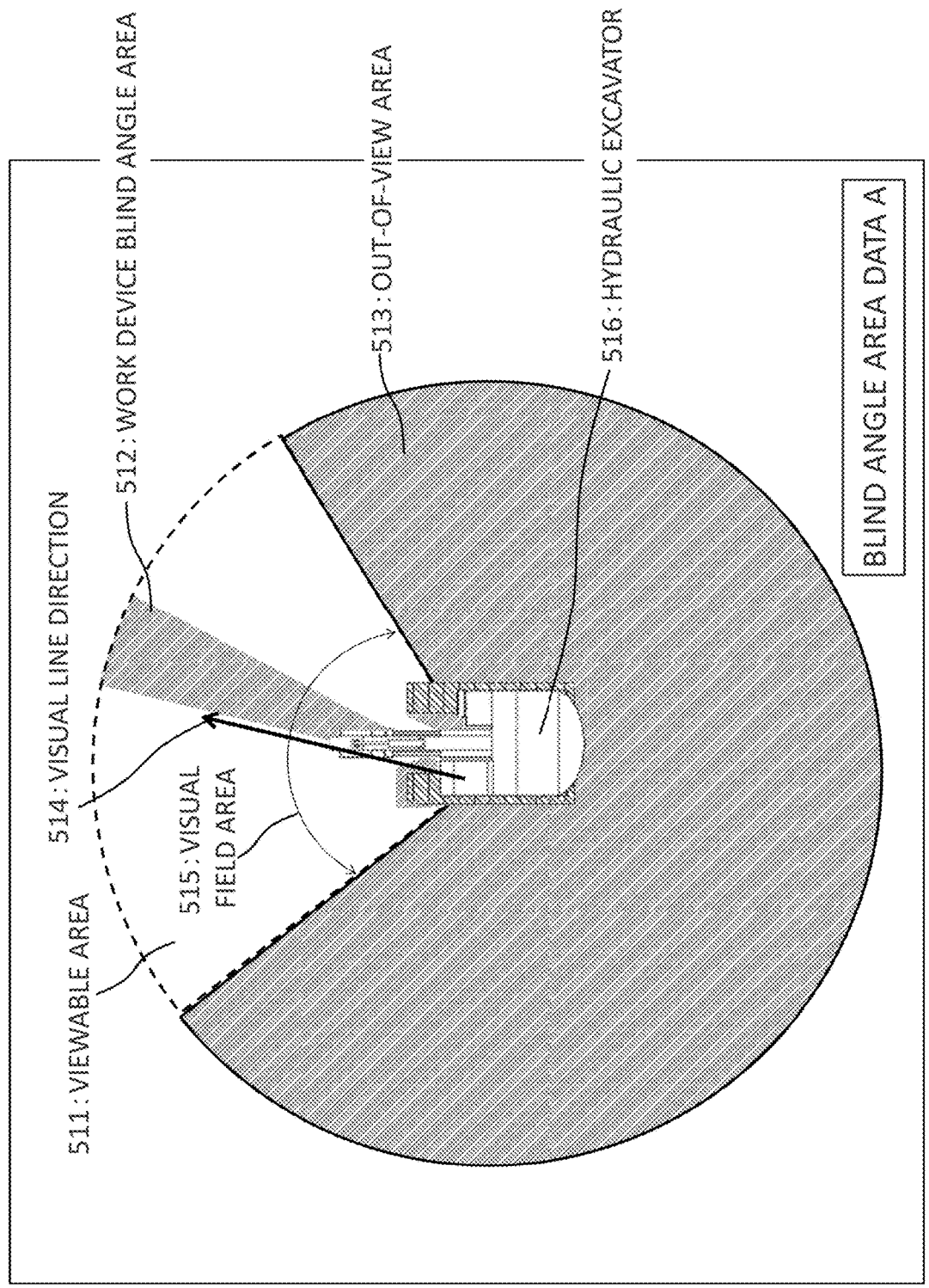

PERIPHERY MONITORING DEVICE OF WORK MACHINE

TECHNICAL FIELD

The present invention relates to a periphery monitoring device of a work machine for detecting an obstacle present in a periphery of the work machine, and outputting a warning for an operator.

BACKGROUND ART

There is known a work machine, such as a hydraulic excavator, which includes a periphery monitoring device for detecting an obstacle, such as a human or an object, present in a periphery of the work machine, and issuing a warning to an operator of the work machine to prevent a collision between the work machine and the obstacle. In an actual work site, however, an operator often intentionally operates a work machine even when recognizing a worker is working near the work machine. In this environment, a warning is issued from the periphery monitoring device even when the worker present near the work machine is recognized.

Patent Document 1 describes one of devices attempting to solve the foregoing problem. The device described in Patent Document 1 determines whether or not an obstacle present in a periphery of a work machine is a human through image processing, and selects a warning level based on a state of the work machine and a positional relationship with the obstacle to reduce unnecessary warnings. A device described in Patent Document 2 determines whether or not an operator visually recognizes an obstacle based on a visual line of the operator, and issues a warning based on the determination to prevent excessive warnings.

PRIOR ART DOCUMENT

Patent Document

Patent Document 1: JP-2010-198519-A
Patent Document 2: JP-2006-027481-A

SUMMARY OF THE INVENTION

Problem to be Solved by the Invention

According to Patent Document 1, however, a degree of danger is determined only based on the positional relationship between the work machine and the obstacle in the periphery, and on the operation of the work machine. In this case, whether the operator actually recognizes the obstacle is not taken into consideration at all. For example, even when the work machine and the obstacle are located in a positional relationship on which a warning is issued based, the possibility of a collision is low in a state that the operator is operating while recognizing the presence of the obstacle. In this case, the degree of necessity of issuing a warning to the operator is not high. When a warning is continuously issued in the same manner as the manner of issue of a warning without recognition of the obstacle by the operator as in the foregoing situation, the operator is highly likely to be bothered by the warning. Accordingly, there is still room for improvement of the device described in Patent Document 1 in such a manner as to issue a warning based on whether or not the operator visually recognizes the obstacle. Patent Document 2 determines visual recognition based on the visual line of the operator, but does not consider a phenomenon peculiar to a work machine, i.e., a change of a blind angle in accordance with operation of the work machine. Particularly in case of a work machine including a front work device, a blind angle is constantly changeable during operation. In this case, it is assumed that an obstacle present behind the front work device cannot be visually recognized even when the visual line of the operator and the position of the obstacle match with each other. Accordingly, determination reliability of visual recognition becomes insufficient when the technology of Reference Document 2 is applied to a work machine.

An object of the present invention is to issue warnings in an appropriate manner without insufficiency and excess when an obstacle is present in a periphery of a work machine.

Means for Solving the Problem

The present application includes a plurality of means for solving the aforementioned problem. One of examples of these means is directed to a periphery monitoring device of a work machine, the periphery monitoring device including a controller that includes: an obstacle detection section that detects an obstacle present in a periphery of the work machine; a position relation calculation section that calculates a positional relationship between the obstacle detected by the obstacle detection section and the work machine; a warning level determination section that determines a warning level based on the positional relationship calculated by the position relation calculation section; and a warning output section that outputs, to an output device, a warning content corresponding to the warning level determined by the warning level determination section. The controller further includes: a mechanical state acquisition section that acquires information regarding a posture and an operation of the work machine; a blind angle calculation section that calculates a blind angle area from a seat in a cab of the work machine based on the information indicating the posture and the operation of the work machine and acquired by the mechanical state acquisition section; and a visibility level determination section that determines a visibility level of the obstacle based on the blind angle area calculated by the blind angle calculation section and the positional relationship calculated by the position relation calculation section. The warning level determination section adjusts the warning level in accordance with the visibility level determined by the visibility level determination section.

Advantage of the Invention

According to the present invention, an appropriate warning can be issued as a warning to notify an operator about presence of an obstacle since it is considered whether or not the operator visually recognizes the obstacle based on a visual line of the operator and a posture of a work machine.

BRIEF DESCRIPTION OF THE DRAWINGS

FIG. 5 is view showing an example of blind angle area data C.

FIG. 6 is chart showing a relationship between an operation by an operator (operation of hydraulic excavator) and a gaze direction (visual line direction) of the operator.

FIG. 7 is view showing an example of blind angle area data A.

MODES FOR CARRYING OUT THE INVENTION

Embodiments of the present invention will be hereinafter described with reference to the drawings.

Embodiment 1

[Basic Structure of Hydraulic Excavator]

Figure 1:
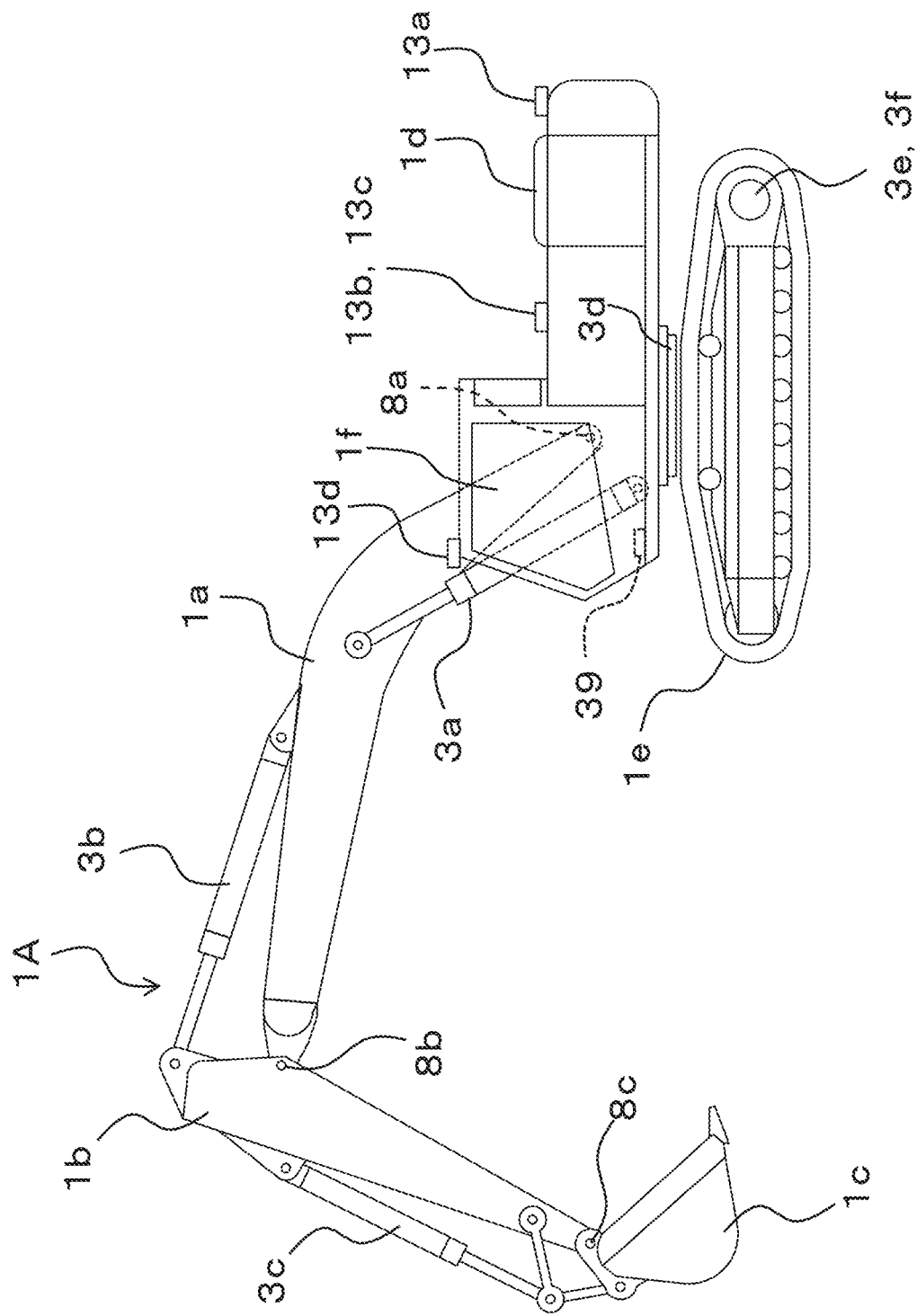
FIG. 1 is a view showing a general structure of a hydraulic excavator according to an embodiment of the present invention.

FIG. 1 is a view showing a general structure of a hydraulic excavator according to an embodiment of the present invention. The hydraulic excavator in FIG. 1 includes a crawler type track structure 1e, and a swing structure 1d swingably attached to an upper part of the track structure 1e. The track structure 1e is driven by left and right traveling hydraulic motors 3e and 3f. The swing structure 1d is driven by torque generated by a swing hydraulic motor 3d to swing in the left-right direction.

A seat in a cab 1f is provided on the swing structure 1d. An articulated front work device 1A capable of forming a target construction surface is attached before the swing structure 1d.

The front work device 1A includes a boom 1a driven by a boom cylinder 3a, an arm 1b driven by an arm cylinder 3b, and a bucket 1c driven by a bucket cylinder 3c.

The seat in the cab 1f is provided with: an operation lever 26 which generates control signals for the boom cylinder 3a, the arm cylinder 3b, the bucket cylinder 3c, the traveling hydraulic motors 3e and 3f, and the swing hydraulic motor 3d (pilot pressures (hereinafter also referred to as Pi pressures) output from gear pump 24 (see FIG. 2)) in accordance with an operation direction and an operation amount to operate the boom 1a, the arm 1b, the bucket 1c, the swing structure 1d, and the track structure 1e in accordance with the control signals; an engine control dial 51 (see FIG. 2) for commanding a target revolution speed of an engine 21 (see FIG. 2); a warning output device 10 (display device 10a and audio output device 10b) which notifies an operator about an obstacle detected in a periphery of the hydraulic excavator; and a back monitor (vision assist device) 11 (see FIG. 2) which shows an area behind the swing structure 1d to assist vision of the operator.

Stereo cameras 13a, 13b, 13c, and 13d are provided on the rear, right side, left side, and front of the swing structure 1d, respectively, to capture videos in respective directions and detect an obstacle. Each of the stereo cameras 13a, 13b, 13c, and 13d functions as an obstacle sensor for detecting an obstacle in a periphery of the hydraulic excavator, and as a distance sensor for detecting a distance from the hydraulic excavator to the obstacle.

Figure 2:
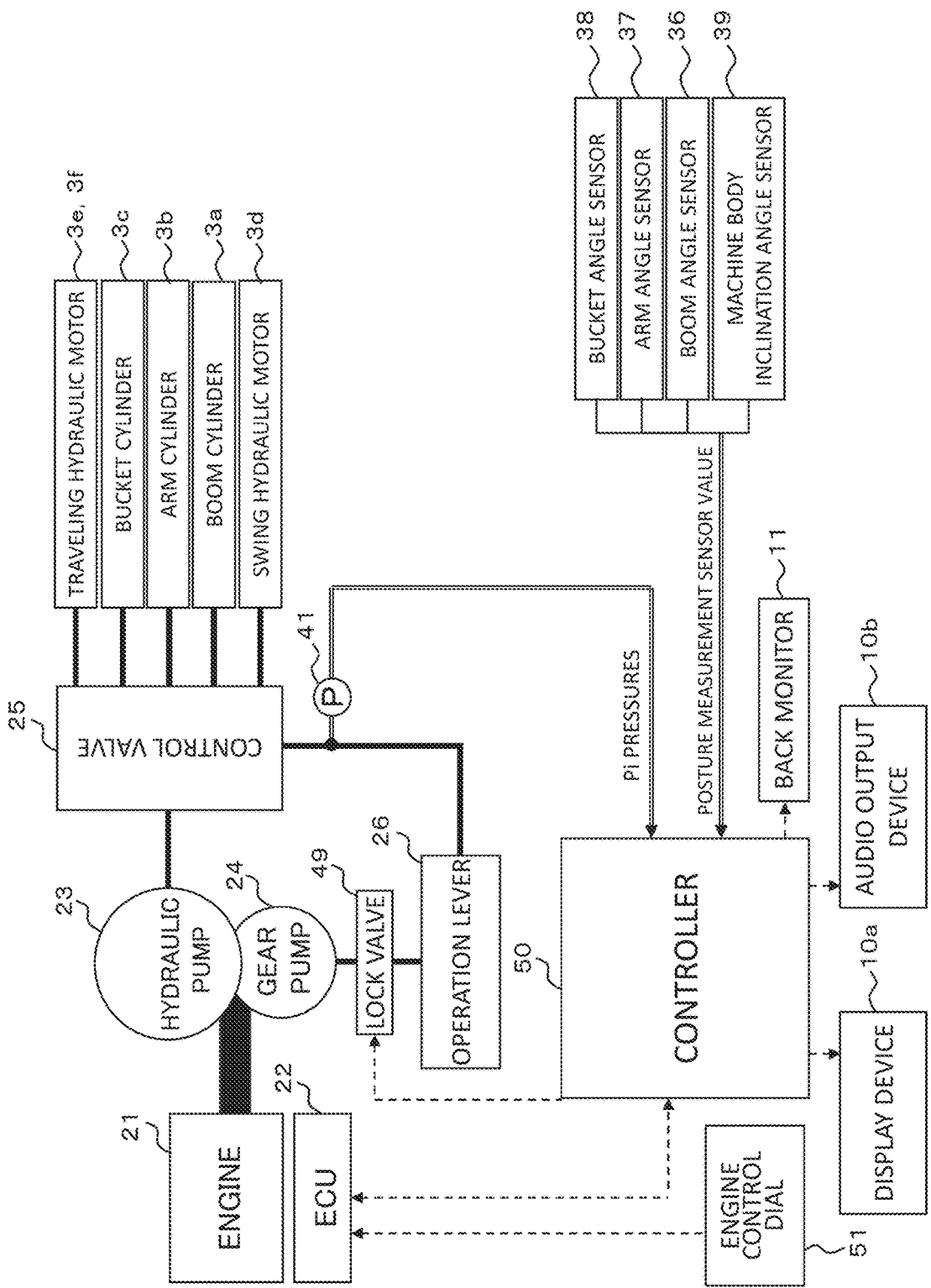
FIG. 2 is a system structure diagram of the hydraulic excavator in FIG. 1.

FIG. 2 is a system structure diagram of the hydraulic excavator in FIG. 1. The hydraulic excavator according to the present embodiment includes: the engine 21; an engine control unit (ECU) 22 as a computer for controlling the engine 21; hydraulic pump 23 and gear pump (pilot pump) 24 mechanically connected to an output shaft of the engine 21 and driven by the engine 21; the operation lever 26 which depressurizes hydraulic fluid delivered from the gear pump 24 in accordance with an operation amount, and outputs the depressurized hydraulic fluid to control valves 25 as control signals for the respective hydraulic actuators 3a, 3b, 3c, 3d, 3e, and 3f; the control valves 25 which control flow rate and direction of working fluid to be introduced from the hydraulic pump 23 to the respective hydraulic actuators 3a, 3b, 3c, 3d, 3e, and 3f based on the control signals (pilot pressures) output from the operation lever 26; a plurality of pressure sensors (pilot pressure sensors) 41 which detect pressure values of Pi pressures applied to the respective control valves 25; a controller 50 as a computer which detects an obstacle present in a periphery of the hydraulic excavator, and generates and outputs a signal of a warning for the operator and a signal of machine body control; the warning output device 10 (display device 10a and audio output device 10b) for notifying the operator about the obstacle detected in the periphery of the hydraulic excavator; and the back monitor (vision assist device) 11 which shows a predetermined area in the periphery of the hydraulic excavator (area behind swing structure 1d in this example) to assist vision of the operator.

Torque and a flow rate of the hydraulic pump 23 are mechanically controlled such that a machine body operates in accordance with target outputs of the respective hydraulic actuators 3a, 3b, 3c, 3d, 3e, and 3f.

A lock valve 49 is provided in delivery piping of the gear pump 24. The lock valve 49 in the present embodiment is an electromagnetic selector valve. An electromagnetic driving portion of the lock valve 49 is electrically connected to the controller 50. The lock valve 49 is normally opened. In this condition, delivery fluid from the gear pump 24 is supplied to the control valves 25 via the operation lever 26. However, when a machine body stop signal is input to the lock valve 49 from a machine body control section 20 in the controller 50, the lock valve 39 closes. In this condition, supply of hydraulic fluid from the gear pump 24 to the operation lever 26 is interrupted, whereby a lever operation is invalidated.

The operation lever 26 mounted in the present embodiment is constituted by a plurality of levers: a first operation lever for instructing on raising and lowering of the boom 1a, and dumping and crowding of the bucket 1c; a second operation lever for instructing on dumping and crowding of the arm 1b, and left swing and right swing of the swing structure 1d; a first traveling lever for instructing on forward revolution and reverse revolution of the traveling motor 3e; and a second traveling lever for instructing on forward revolution and reverse revolution of the traveling motor 3f (all levers not shown). Each of the first operation lever and the second operation lever is a multifunctional operation lever performing two operations. A front-rear operation of the first operation lever corresponds to raising and lowering of the boom 1a. A left-right operation of the first operation lever corresponds to crowding and dumping of the bucket 1c. A front-rear operation of the second operation lever corresponds to dumping and crowding of the arm 1b. A left-right operation of the second operation lever corresponds to left rotation and right rotation of the swing structure 1d. When any of the levers is operated in an oblique direction, the two actuators associated with the operated lever simultaneously operate. Each of the first traveling lever and the second traveling lever is a single-function operation lever. A front-rear operation of the first traveling lever corresponds to forward revolution and reverse revolution of the traveling motor 3e. A front-rear operation of the second traveling lever corresponds to forward revolution and reverse revolution of the traveling motor 3f.

There are provided the same number of the control valves 25 as the number of the hydraulic actuators 3a, 3b, 3c, 3d, 3e, and 3f corresponding to control targets. However, FIG. 2 collectively shows the control valves 25 as one unit. Two Pi pressures are each applied to each of the control valves to shift a spool inside the control valve to one side or the other side in the axial direction. For example, Pi pressure for boom raising and Pi pressure for boom lowering are applied to the control valve 25 for the boom cylinder 3a.

The pressure sensors 41 each detect Pi pressure applied to the corresponding control valve 25. The two pressure sensors 41 are provided for each of the control valves 25. However, the pressure sensors 41 are collectively shown as one unit in FIG. 2. The pressure sensors 41 are disposed immediately below the control valves 25 to detect Pi pressures actually applied to the corresponding control valves 25. A pressure detected by each of the pressure sensors 41 indicates operation direction and operation amount of the corresponding one of the first and second operation levers and the first and second traveling levers constituting the operation lever 26.

The controller 50 includes an input section, a central processing unit (CPU) as a processor, a read-only memory (ROM) and a random access memory (RAM) as a storage device, and an output section. The input section converts various information input to the controller 50 into a form calculable by the CPU. The ROM is a recording medium which stores a control program executing arithmetic processing described below, various information necessary for executing the arithmetic processing, and others. The CPU performs predetermined arithmetic processing for signals acquired from the input section and the ROM and RAM under the control program stored in the ROM. For example, commands necessary for issuing warnings from the warning output device 10 are output from the output section. The storage device is not limited to a semiconductor memory such as ROM and RAM described above. For example, the storage device may be replaced with a magnetic storage device such as a hard disk drive.

The warning output device 10 (display device 10a and audio output device 10b), the ECU 22, the plurality of pressure sensors 41, a bucket angle sensor 8a, an arm angle sensor 8b, a boom angle sensor 8c, a machine body inclination angle sensor 8d, and the lock valve 49 are connected to the controller 50.

The controller 50 calculates a posture of the front work device 1A based on input signals received from the bucket angle sensor 8a, the arm angle sensor 8b, the boom angle sensor 8c, and the machine body inclination angle sensor 8d, and calculates an operation of the front work device 1A based on input signals received from the pressure sensors 41. According to the present embodiment, therefore, the bucket angle sensor 8a, the arm angle sensor 8b, the boom angle sensor 8c, and the machine body inclination angle sensor 8d function as posture sensors of the front work device 1A. The pressure sensors 41 function as operation sensors of the front work device 1A. The machine body inclination angle may be calculated from input signals received from two GNSS antennas provided for this purpose.

The means and methods for calculating the posture of the front work device 1A and pilot pressure described in the present document are presented only by way of example. Other known calculation means and methods may be adopted.

[Functional Structure of Controller 50]

Figure 3:
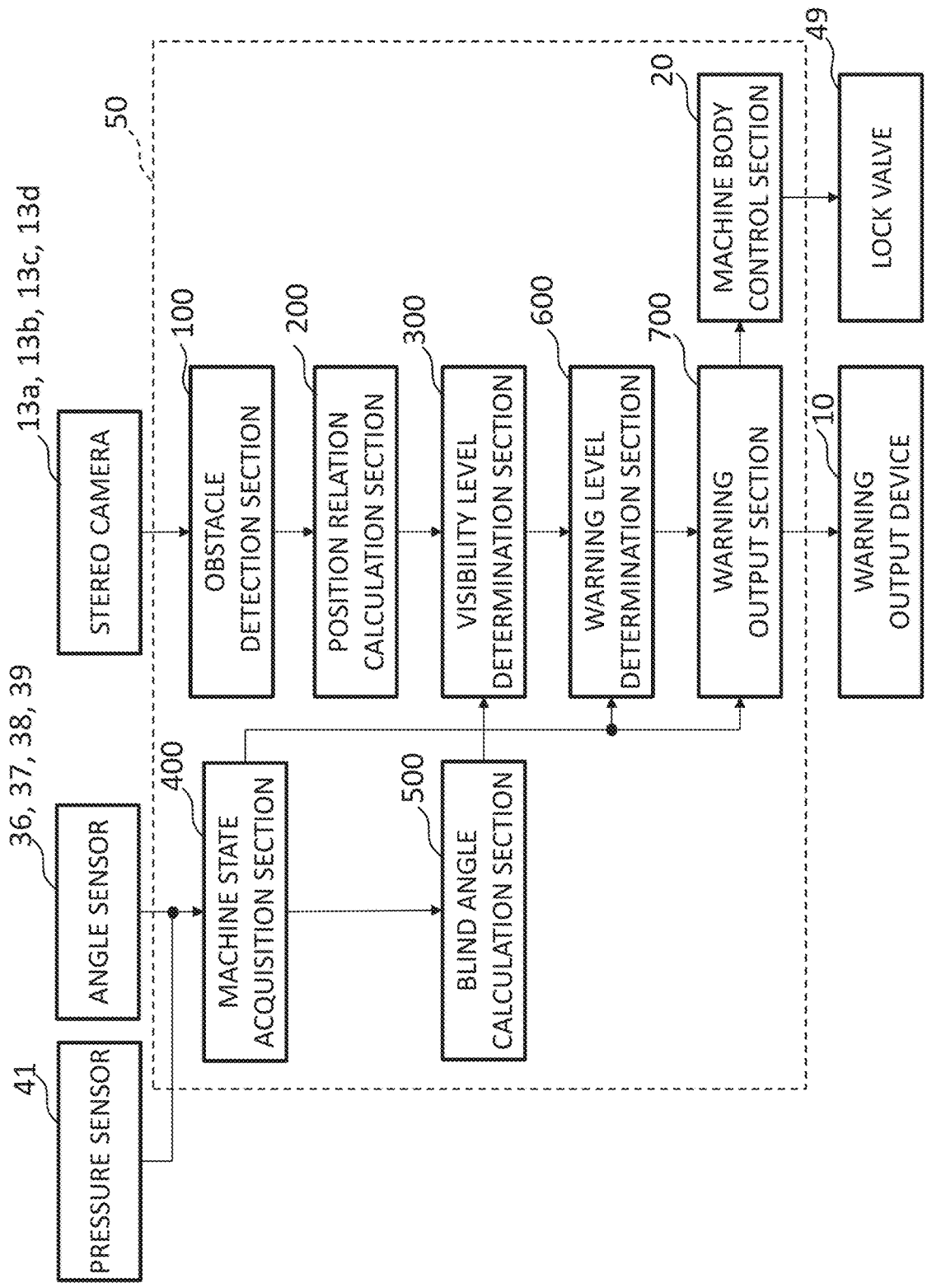
FIG. 3 is a function block diagram of a controller 50 according to Embodiment 1 of the present invention.

FIG. 3 is a function block diagram of the controller 50 according to Embodiment 1 of the present invention. As shown in this figure, the controller 50 is allowed to function as an obstacle detection section 100, a position relation calculation section 200, a visibility level determination section 300, a mechanical state acquisition section 400, a blind angle calculation section 500, a warning level determination section 600, a warning output section 700, and the machine body control section 20 by arithmetic processing of the central processing unit under the control program stored in the storage device.

The obstacle detection section 100 detects an obstacle present in a periphery of an excavator by image processing based on parallax images acquired by the stereo cameras 13a, 13b, 13c, and 13d attached to an upper surface of an outer circumferential portion of the swing structure 1d, and calculates position coordinates of the obstacle in respective camera coordinate systems, and an attribute of the obstacle (human or other object). The position coordinates of the obstacle obtained herein are output to the position relation calculation section 200, while the attribute of the obstacle is output to the warning level determination section 600.

The position relation calculation section 200 retains information regarding positions and directions of the stereo cameras 13a, 13b, 13c, and 13d in a machine body coordinate system. The position relation calculation section 200 converts the position coordinates of the obstacle detected by the obstacle detection section 100 in the respective camera coordinate systems into position coordinates in the machine body coordinate system. Thereafter, the position relation calculation section 200 calculates a positional relationship between each obstacle and the hydraulic excavator in the machine body coordinate system. The position coordinates of the obstacle calculated herein in the machine body coordinate system are output to the visibility level determination section 300, the warning level determination section 600, and the warning output section 700.

The mechanical state acquisition section 400 computes a posture of the hydraulic excavator based on angles of respective links 1a, 1b, and 1c obtained from the angle sensors 8a, 8b, 8c, and 8d. The mechanical state acquisition section 400 also determines an operation of the operation lever 26 by the operator based on output from the pilot pressure sensors 41 to identify an operation of the hydraulic excavator. Posture information and operation information regarding the hydraulic excavator obtained herein are output to the blind angle calculation section 500 and the warning level determination section 600.

The blind angle calculation section 500 calculates a blind angle area from the seat in the cab of the hydraulic excavator based on the posture information and operation information concerning the hydraulic excavator and acquired by the mechanical state acquisition section 400. The blind angle area obtained herein is output to the visibility level determination section 300. Details of a process performed by the blind angle calculation section 500 will be described below with reference to FIG. 4.

The visibility level determination section 300 determines a visibility level of the obstacle based on the blind angle area calculated by the blind angle calculation section 500, and the positional relationship between the obstacle and the hydraulic excavator calculated by the position relation calculation section 200. The visibility level obtained herein is output to the warning level determination section 600. Details of a process performed by the visibility level determination section 300 will be described below with reference to FIG. 13.

The warning level determination section 600 determines a warning level based on the positional relationship between the obstacle and the hydraulic excavator calculated by the position relation calculation section 200, and adjusts the determined warning level in accordance with the visibility level determined by the visibility level determination section 300. The warning level determined herein is output to the warning output section 700. Details of a process performed by the warning level determination section 600 will be described below with reference to FIG. 14.

The warning output section 700 outputs a warning content corresponding to the warning level determined by the warning level determination section 600 to the warning output device 10 and the machine body control section 20. Details of a process performed by the warning output section 700 will be described below with reference to FIG. 15.

[Process Flow of Blind Angle Calculation Section 500]

Figure 4:
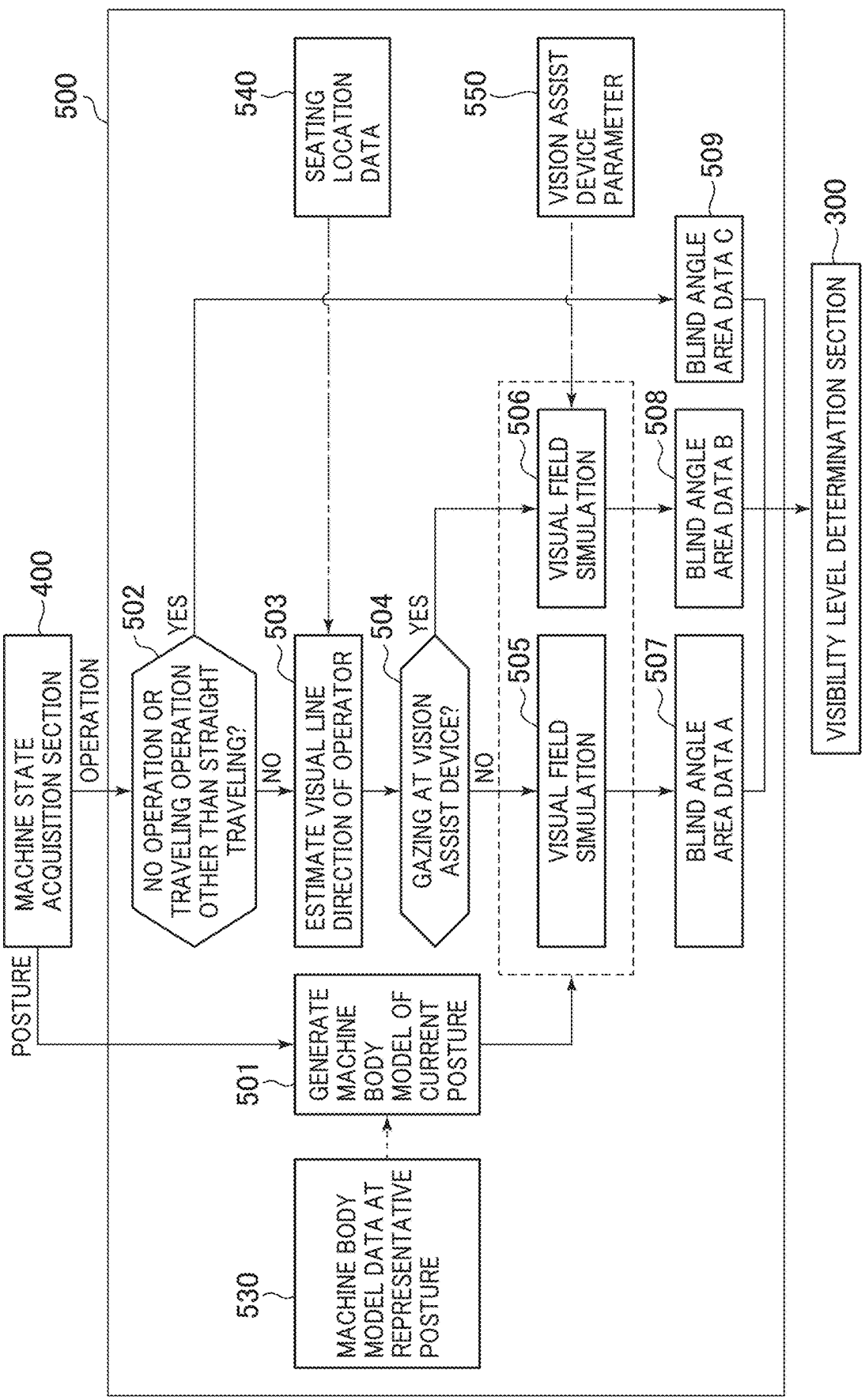
FIG. 4 is a chart showing a flow of a process performed by a blind angle calculation section 500 according to Embodiment 1.

Details of the process performed by the blind angle calculation section 500 will be initially described with reference to FIG. 4. FIG. 4 is a chart showing a flow of the process performed by the blind angle calculation section 500. The storage device stores three-dimensional model data of the hydraulic excavator at a certain representative posture (machine body model data) 530. In step 501, the blind angle calculation section 500 generates a machine body model reflecting current posture information based on the posture information concerning the hydraulic excavator and obtained from the mechanical state acquisition section 400 and the machine body model data 530.

In step 502 performed simultaneously with step 501, the blind angle calculation section 500 determines whether or not one of no operation and traveling operation other than straight traveling has been performed for the operation lever 26 based on signals from the pilot pressure sensors 41. The "straight traveling" herein refers to moving the track structure 1e forward or backward by operating the first traveling lever and the second traveling lever of the operation lever 26 in the same direction by substantially the same amount. When it is determined that one of no operation and traveling operation other than straight traveling has been performed in step 502, the process proceeds to step 509. When it is determined that operation or no traveling operation other than straight traveling has been performed, the process proceeds to step 503.

In step 509 where one of no operation and traveling operation other than straight traveling has been performed, it is assumed that the operator is paying attention to a plurality of directions. Accordingly, the blind angle calculation section 500 generates "blind angle area data C" which designates the entire periphery of the hydraulic excavator as a blind angle area without estimation of the visual line direction (visual line) of the operator. FIG. 5 is view showing an example of the blind angle area data C. In this case, the blind angle calculation section 500 designates the entire periphery of the hydraulic excavator 516 as a blind angle area 521, whereafter the process ends. The blind angle area data C generated in step 509 is output to the visibility level determination section 300.

In step 503, the blind angle calculation section 500 estimates the visual line direction (visual line) of the operator based on the operation information concerning the hydraulic excavator and obtained from the mechanical state acquisition section 400, and seating location data 540 about the operator inside the cab 1f. The seating location data 540 about the operator is data indicating a head position when the operator sits on the seat inside the cab 1f. This value may be set for each operator. According to the present embodiment, however, a common value is set for a plurality of operators. The common value herein may be an average of adults in respective countries or regions where the hydraulic excavator is operated.

It is assumed that the operator has a visual line in the operation direction of the machine during operation (including straight traveling operation). According to the present embodiment, therefore, a gaze direction (visual line direction) of the operator during each operation is determined in a manner described in FIG. 6 in step 503.

FIG. 6 is chart showing a relationship between an operation by the operator (operation of hydraulic excavator) and the gaze direction (visual line direction) of the operator. A "vision assist device" in a column "gaze direction of operator" in the figure is the back monitor 11 (see FIG. 2) provided inside the cab 1f and showing an image captured by the stereo camera 13a located at the rear. The vision assist device includes a side mirror, for example, in addition to the back monitor 11. These side mirror will be described in Embodiment 2. The blind angle calculation section 500 determines which of the front operation, right swing, left swing, forward, and backward has been selected for the current operation of the hydraulic excavator based on output from the pilot pressure sensors 41. Thereafter, the blind angle calculation section 500 searches the operation associated with the determination result from a column "operation by operator" in a table in FIG. 6, and designates the location described in the cell positioned on the right side of the cell of the searched operation (corresponding cell in column "gaze direction of operator") as the gaze direction of the operator. When an operation of the front work device 1A is detected, for example, a claw tip position of the bucket 1c (front claw tip position) corresponds to the gaze direction. When the gaze direction is determined with reference to FIG. 6, the blind angle calculation section 500 specifies (estimates) the visual line direction of the operator by using a vector extending in the gaze direction obtained from FIG. 6 with an origin located at the head position of the operator obtained from the seating location data 540. Thereafter, the process proceeds to step 504. According to the present embodiment, the front claw tip position is regarded as the gaze direction when combined operations of the front work device 1A and another operation are detected.

In step 504, the blind angle calculation section 500 determines whether or not determination of a gaze at the vision assist device has been made in step 503. When a gaze at the vision assist device is not made, the process proceeds to step 505. When a gaze at the vision assist device is made, the process proceeds to step 506.

When it is determined that a gaze is not made at the vision assist device in step 504 (when process proceeds to step 505), the operator is considered to be checking the environment in the periphery of the machine body by a direct view. In this case, the blind angle calculation section 500 performs visual field simulation which virtually generates "blind angle area data A" considering the posture of the front work device 1A based on the machine body model at the current posture generated in step 501, and the seating location data 540 about the operator. An area invisible behind the front work device 1A on the basis of a pupil position estimated from the head position of the operator specified by the seating location data 540 is referred to as a work device blind angle area.

FIG. 7 is view showing an example of the blind angle area data A. This example specifies a visual field area 515 (e.g., any value ranging from 60 to 100 degrees) visually recognizable by a peripheral view on the basis of a visual line vector (visual line direction) 514 of the operator in the machine body coordinate system estimated in step 503, and reflects the work device blind angle area 512 generated by the posture of the front work device 1A within the visual field area 515. The blind angle area in this case corresponds to the sum of an out-of-view area 513 and the work device blind angle area 512. On the other hand, a viewable area 511 is a remaining area of the visual field area 515 from which the work device blind angle area 512 is subtracted.

Figure 8:
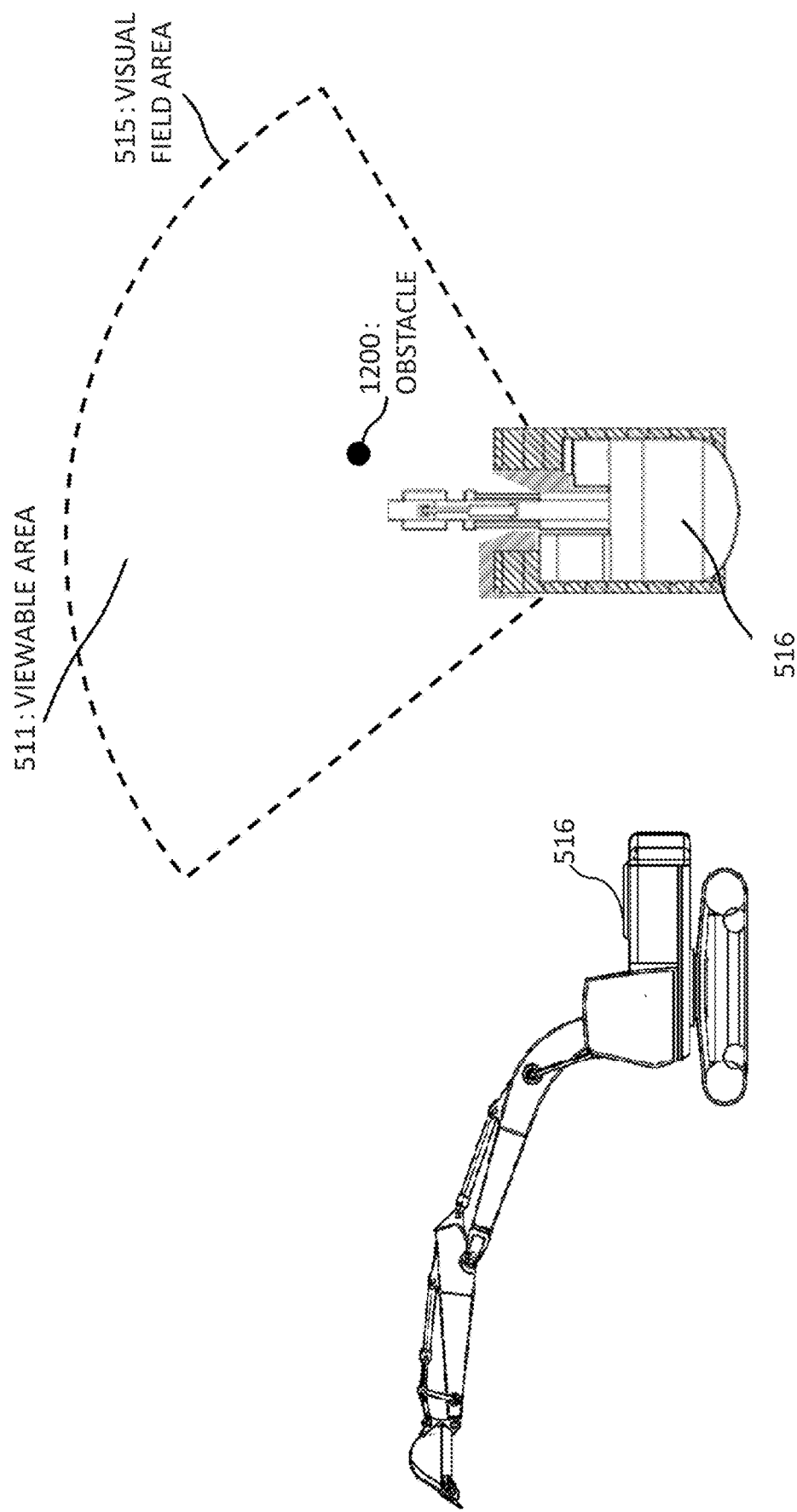
FIG. 8 is a view showing a viewable area 511 when a front work device 1A is located above a visual line of an operator in a cab 1f.
Figure 9:
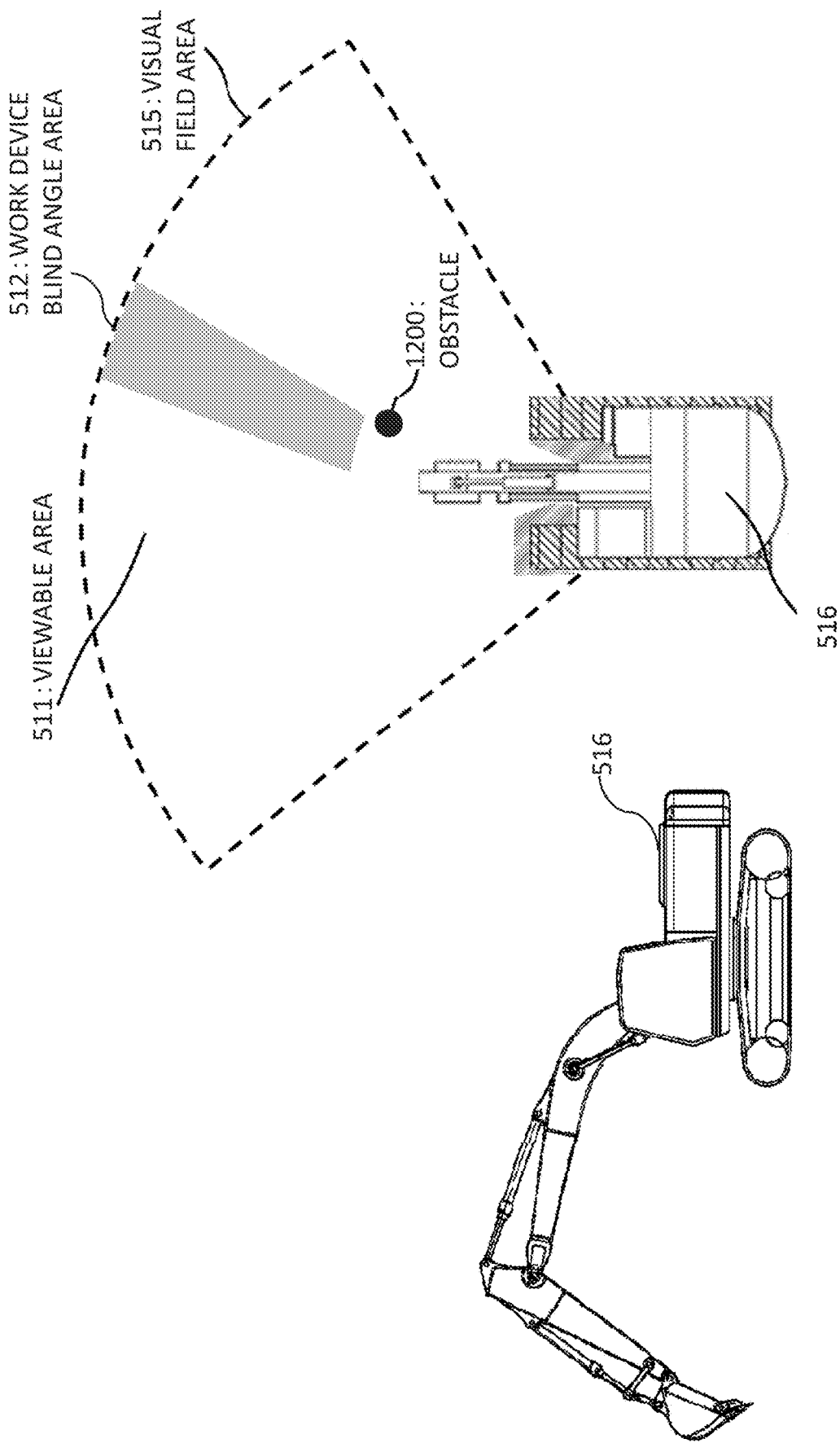
FIG. 9 is a view showing the viewable area 511 of the operator when an arm 1b is operated toward a crowding side from the position of the arm 1b in FIG. 8.
Figure 10:
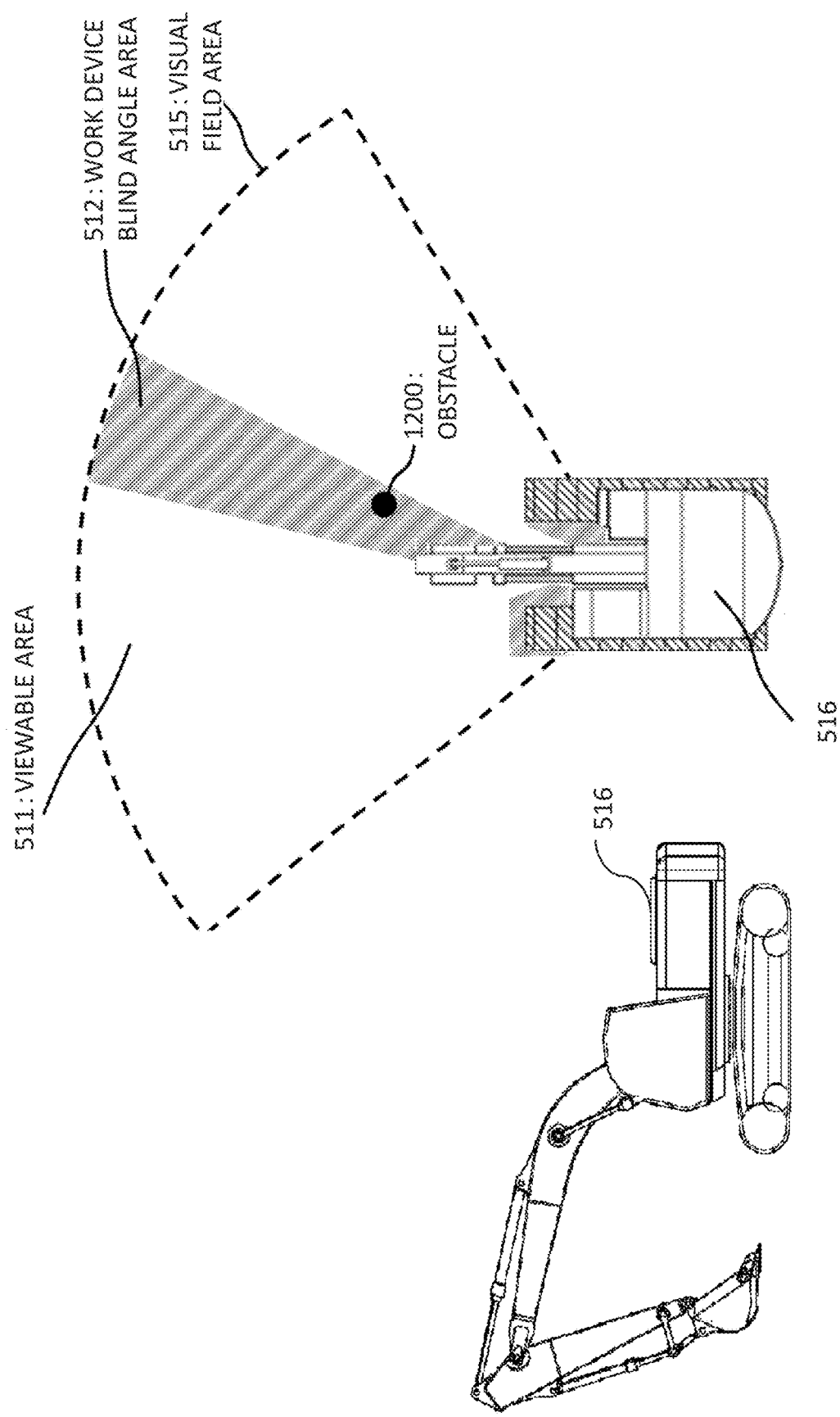
FIG. 10 is a view showing the viewable area 511 of the operator when the arm 1b is further operated toward the crowding side from the position of the arm 1b in FIG. 9.

The work device blind angle area 512 in FIG. 7 changes in accordance with the posture of the front work device 1A. This point will be now described. FIG. 8 is a view showing the viewable area 511 when the front work device 1A is located above the visual line of an operator in the cab 1f. In this case, the visual field of the operator is not interrupted by the front work device 1A, wherefore no work device blind angle area is produced by the front work device 1A. Accordingly, the viewable area 511 matches with the visual field area 515. FIG. 9 is a view showing the viewable area 511 of the operator when the arm 1b is operated toward the crowding side (swing structure 1d side) from the position of the arm 1b in FIG. 8. In this intermediate posture, a part of the visual field of the operator is interrupted by the front work device 1A. Accordingly, the work device blind angle area 512 is produced. The viewable area 511 in this case is a remaining area of the visual field area 515 from which the work device blind angle area 512 is subtracted. FIG. 10 is a view showing the viewable area 511 of the operator when the arm 1b is further operated toward the crowding side from the position of the arm 1b in FIG. 9. In this figure, the work device blind angle area 512 becomes wider than that area in FIG. 9 by interruption of the visual field of the operator by the front work device 1A.

In step 507, the blind angle area data A obtained in step 505 is output to the visibility level determination section 300.

When it is determined that the operator gazes at the vision assist device in step 504 (when process proceeds to step 506), the operator visually recognizes only the region shown on the vision assist device. In this case, it is assumed that the other area become a blind angle area. Accordingly, "blind angle area data B," which indicates an indirect visual field when the operator gazes at the vision assist device, is generated in step 506 by using the machine body model at the current posture generated in step 501, and a vision assist device parameter 550 indicating information regarding an angle of view, attachment position and attachment angle, and the like of the stereo camera 13a.

Figure 11:
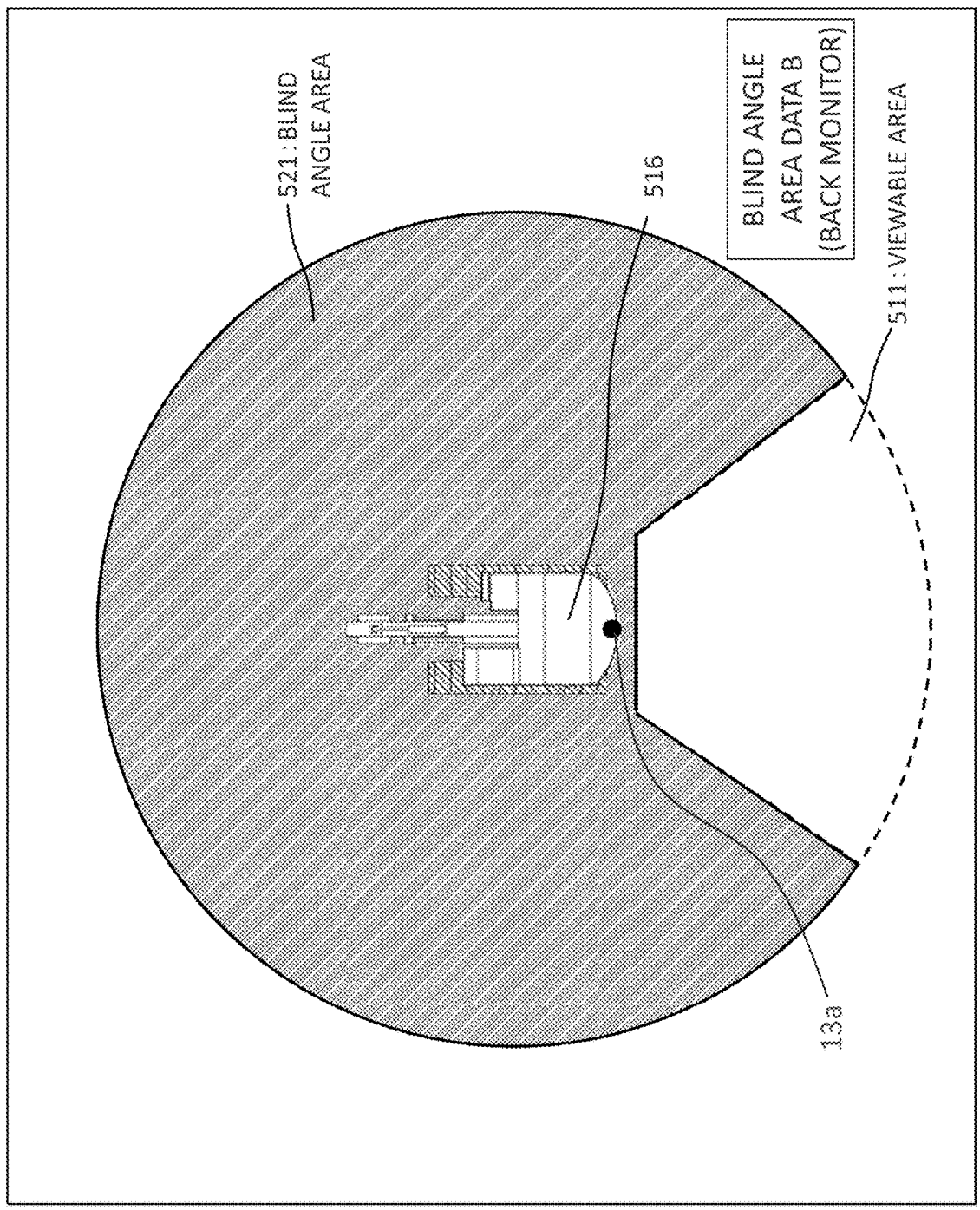
FIG. 11 is a view showing an example of blind angle area data B when a stereo camera 13a is used as a vision assist device.

FIG. 11 is a view showing an example of the blind angle area data B when the stereo camera 13a (back monitor 11) is used as the vision assist device. An area shown by the vision assist device at which the operator gazes is designated as the viewable area 511, while the remaining area is designated as the blind angle area 521.

The blind angle area data B generated in step 508 is output to the visibility level determination section 300.

[Process Flow of Visibility Level Determination Section 300]

Figure 13:
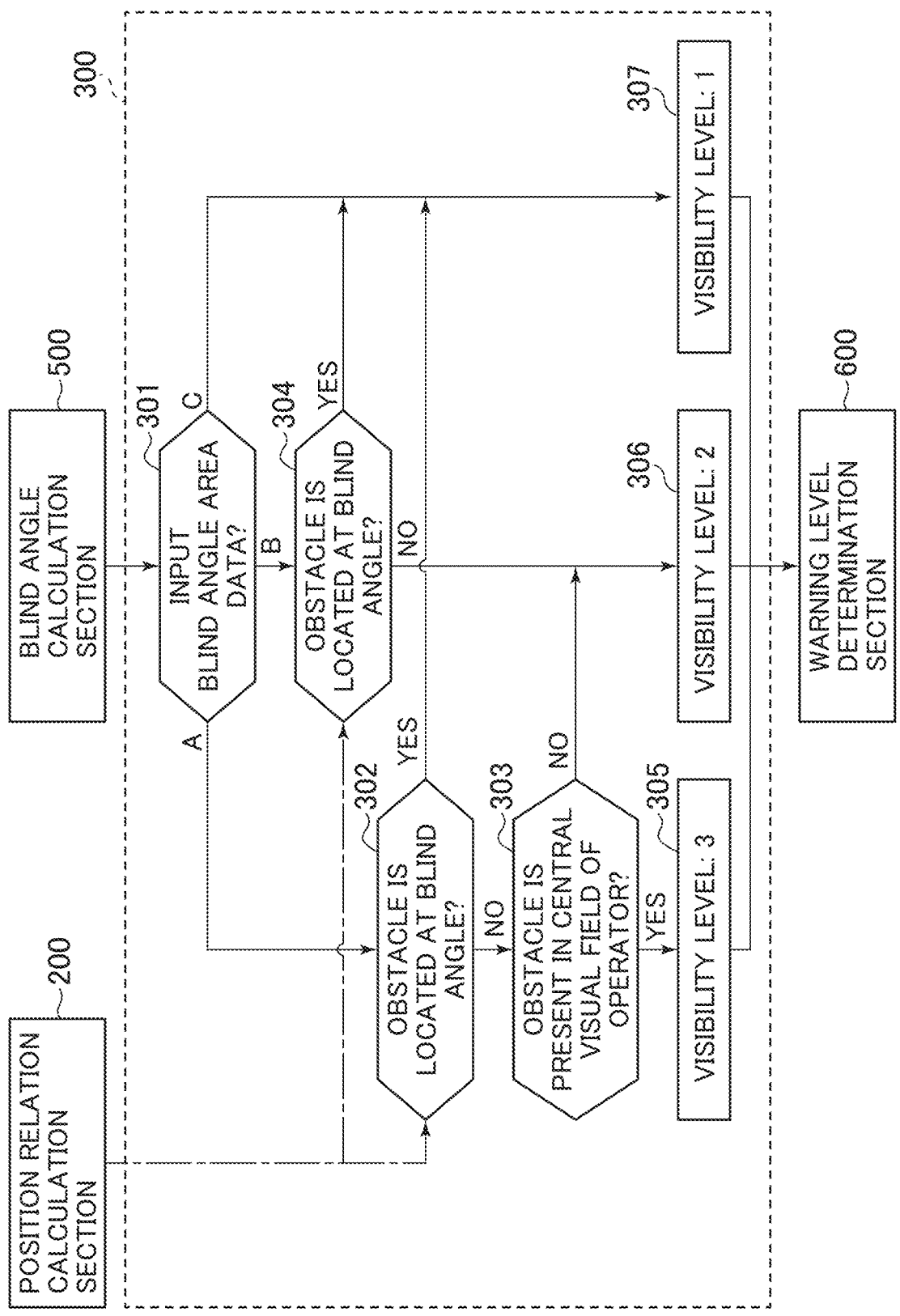
FIG. 13 is a chart showing a flow of a process performed by a visibility level determination section 300.

Details of the process performed by the visibility level determination section 300 will be described below with reference to FIG. 13. FIG. 13 is a chart showing a flow of the process performed by the visibility level determination section 300.

In step 301, the visibility level determination section 300 initially determines a type of blind angle area data obtained from the blind angle calculation section 500. When a determination of the blind angle area data A is made, the process proceeds to step 302. When a determination of the blind angle area data B is made, the process proceeds to step 304. When a determination of the blind angle area data C is made, the process proceeds to step 307.

In step 302, the visibility level determination section 300 determines whether or not the position coordinates of the obstacle in the machine body coordinate system obtained from the position relation calculation section 200 are contained in the blind angle area data A to determine whether or not the operator visually recognizes the obstacle in the direct visual field. When the target obstacle is present in the blind angle area (e.g., when obstacle 1200 is located within work device blind angle area 512 as shown in FIG. 10), it is considered that the operator does not visually recognize the obstacle. In this case, the process proceeds to step 307 to select level 1 as the visibility level, and shifts to a subsequent step performed by the warning level determination section 600. When the target obstacle is present in the viewable area, it is considered that the operator visually recognizes the obstacle in the direct visual field (e.g., when obstacle 1200 is positioned within viewable area 511 as shown in FIG. 9), the process proceeds to step 303.

In step 303, the visibility level determination section 300 determines whether or not the operator visually recognizes the obstacle in a central visual field based on a distance between the obstacle and the visual line direction of the operator. According to the present embodiment, the visual field direction (vector) of the operator is defined by a line. When the distance between the line and the obstacle falls within a predetermined distance D1, the operator is considered to visually recognize the obstacle in the central visual field. When the distance exceeds the predetermined distance D1, the operator is considered to visually recognize the obstacle in a peripheral visual field. When the obstacle is present within the central visual field, the possibility of visual recognition of the obstacle by the operator is considered to be higher than that possibility when the obstacle is present in the peripheral visual field. Accordingly, when it is determined that the operator visually recognizes the obstacle in the central visual field, level 3 is selected as the visibility level for the obstacle (step 305). On the other hand, when it is determined that the operator visually recognizes the obstacle in the peripheral visual field, level 2 is selected as the visibility level for the obstacle (step 306). The possibility of visually recognition of the obstacle by the operator increases as the value of the "visibility level" is higher in the present document. When the obstacle is visually recognized in the central visual field, level 3 indicating the highest possibility of visual recognition is selected as the visibility level.

In step 304, similarly to step 302, the visibility level determination section 300 determines whether or not the position coordinates of the obstacle in the machine body coordinate system obtained from the position relation calculation section 200 are contained in the blind angle area data B to determine whether or not the operator visually recognizes the obstacle through the vision assist device. It is assumed that visibility in the indirect visual field using the vision assist device is lower than visibility in the direct visual field through naked eyes. Accordingly, in case of visual recognition of the obstacle using the vision assist device, level 2 which is lower than the level for the naked eyes is selected as the visibility level (step 306). When the obstacle is not visually recognized, level 1 is selected as the visibility level (step 307).

When a determination of the blind angle area data C is made in step 301, the entire area corresponds to a blind angle area. Accordingly, the visibility level determination section 300 selects level 1 as the visibility level for the obstacle (step 307).

The visibility levels determined in steps 305, 306, and 307 in the manner described above is output to the warning level determination section 600.

[Process Flow of Warning Level Determination Section 600]

Figure 14:
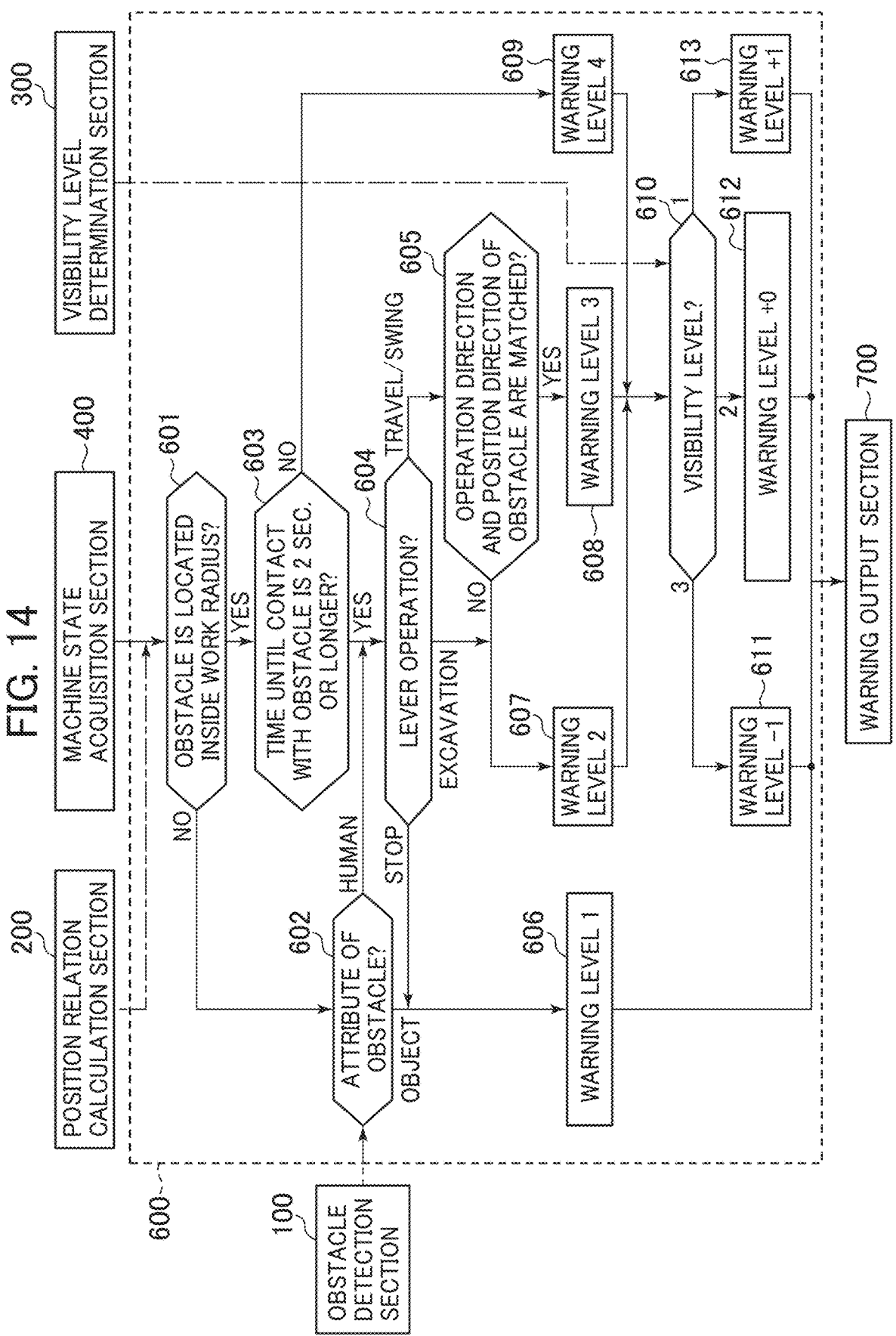
FIG. 14 is a chart showing a flow of a process performed by a warning level determination section 600.

Details of the process performed by the warning level determination section 600 will be described with reference to FIG. 14. FIG. 14 is a chart showing a flow of the process performed by the warning level determination section 600. The warning level determination section 600 sets a warning level concerning a danger of contact between the hydraulic excavator and the obstacle in accordance with the attribute of the obstacle, the distance between the hydraulic excavator and the obstacle, the operation content of the operation lever 26 and the like, and adjusts the warning level in accordance with the visibility level determined by the visibility level determination section 300 to determine a final warning level.

In step 601, the warning level determination section 600 initially determines whether or not the obstacle is present within a work radius of the work machine based on output from the position relation calculation section 200 and the mechanical state acquisition section 400. When the obstacle is present within the work radius, the process proceeds to step 603. When the obstacle is absent within the work radius, the process proceeds to step 602. The "work radius" herein refers to a distance from a swing center of the hydraulic excavator to a farthest end of the front work device 1A, and is changeable in accordance with posture information regarding the hydraulic excavator.

In step 603, the warning level determination section 600 calculates a shortest arrival time required for the hydraulic excavator to arrive at a position where the obstacle is present based on a movement characteristic of the hydraulic excavator and the distance from the obstacle. When the shortest arrival time at the obstacle is 2[s] or shorter, the degree of danger of contact is high. In this case, level 4 is selected as the warning level (step 609). On the other hand, when the arrival time is 2[s] or longer, the process proceeds to step 604.

In step 602, the warning level determination section 600 determines whether the obstacle has an attribute of human or an attribute of object based on output from the obstacle detection section 100. When it is determined that the obstacle is an object, the warning level determination section 600 selects the lowest level 1 as the warning level in step 606. Thereafter, the process ends. On the other hand, when it is determined that the obstacle is a human, the process proceeds to step 604.

In step 604, the warning level determination section 600 identifies an operation corresponding to the operation details of the operation lever 26 (output values of pressure sensors 41). When it is determined that no lever operation is performed, level 1 is selected as the warning level. Thereafter, the process ends (step 606). When an operation associated with only the link members 1a, 1b, and 1c of the front work device 1A is detected, it is determined that excavating is being executed. In this case, the degree of danger of contact is relatively low, wherefore level 2 is selected as the warning level (step 607). When an operation associated with the swing motor 3d or the traveling motors 3e and 3f is detected, it is considered that the hydraulic excavator is swinging or performing traveling operation. In this case, the process proceeds to step 605.

In step 605, the warning level determination section 600 determines whether or not the direction of operation of the hydraulic excavator matches with the direction of the position of the obstacle. According to the present embodiment, it is determined that the operation direction of the hydraulic excavator matches with the direction of the position of the obstacle when the obstacle is present in the operation direction of the hydraulic excavator. When it is determined that the operation direction and the obstacle position match with each other, it is considered that a degree of danger of contact is high. Accordingly, level 3 is selected as the warning level (step 608). When it is determined that no matching is made, level 2 is selected as the warning level (step 607).

When one of levels 2 to 4 is selected as the warning level via any one of steps 607, 608, and 609 in the foregoing process, the warning level is adjusted in accordance with the visibility level in step 610 to determine the warning level to be finally output. When level 3 is selected as the visibility level by the visibility level determination section 300, i.e., when the possibility of visual recognition of the obstacle is high, the warning level input in step 610 (warning level temporarily selected in any of steps 607, 608, and 609) is lowered by one level herein. Similarly, when level 2 is selected as the visibility level, the input warning level is maintained. When level 1 is selected as the visibility level, the input warning level is raised by one level. When adjustment of the warning level is completed in this manner, the warning level determination section 600 outputs the determined warning level to the warning output section 700.

As described above, a warning or machine body control considering recognition of the object by the operator can be implemented by adjusting the warning level in accordance with the visibility level indicating the possibility of visual recognition of the obstacle by the operator.

[Process Flow of Warning Output Section 700]

Figure 15:
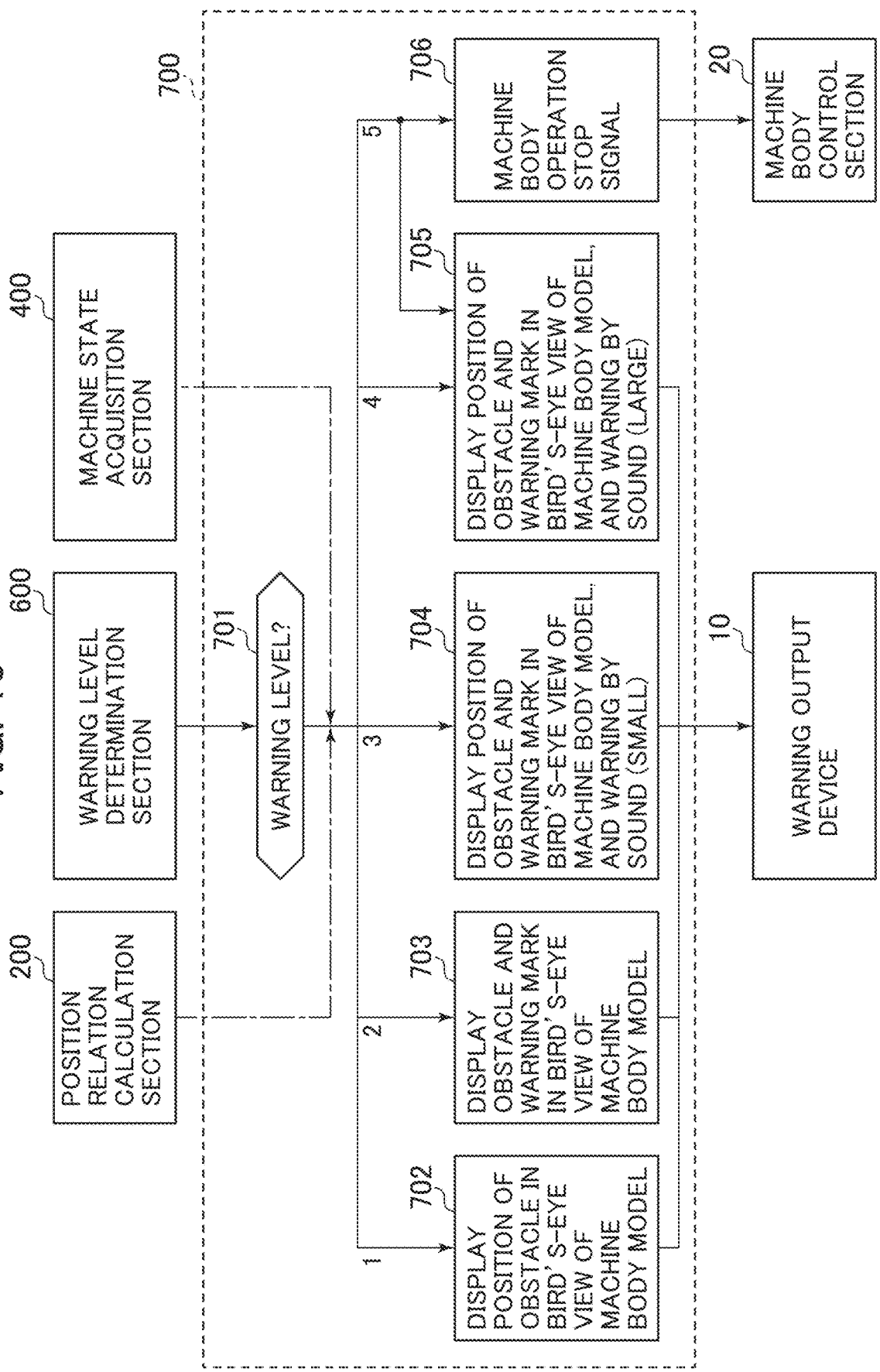
FIG. 15 is a chart showing a flow of a process performed by a warning output section 700.

Details of the process performed by the warning output section 700 will be described below with reference to FIG. 15. FIG. 15 is a chart showing a flow of the process performed by the warning output section 700. As shown in this figure, the warning output section 700 determines an output content corresponding to the warning level selected by the warning level determination section 600, and outputs a signal for implementing the output content to the warning output device 10 and the machine body control section 20.

Figure 16:
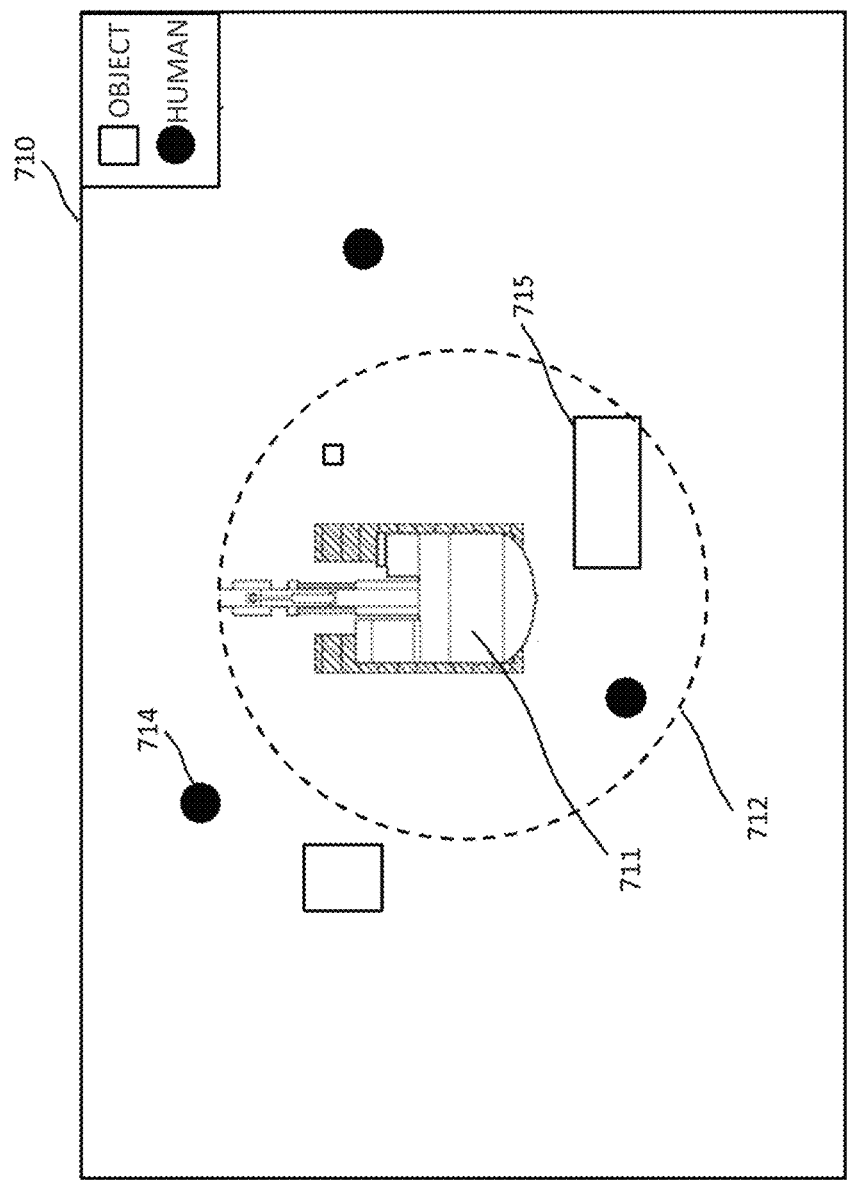
FIG. 16 is a view showing an example of a warning screen of warning level 1.

In case of warning level 1, the warning output section 700 has the display device 10a display the obstacle position in a bird's eye view of the machine body model based on output from the position relation calculation section 200 and the mechanical state acquisition section 400. FIG. 16 is a view showing an example of a display screen of this display. This display screen shows a machine body model 711 at the center, and a circle 712 indicating the work radius of the hydraulic excavator, marks 714 each indicating a position of a human (obstacle), and marks 715 each indicating a position of an object. Warning contents similar to the contents of warning level 1 are displayed for other warning levels 2 to 5.

Figure 17:
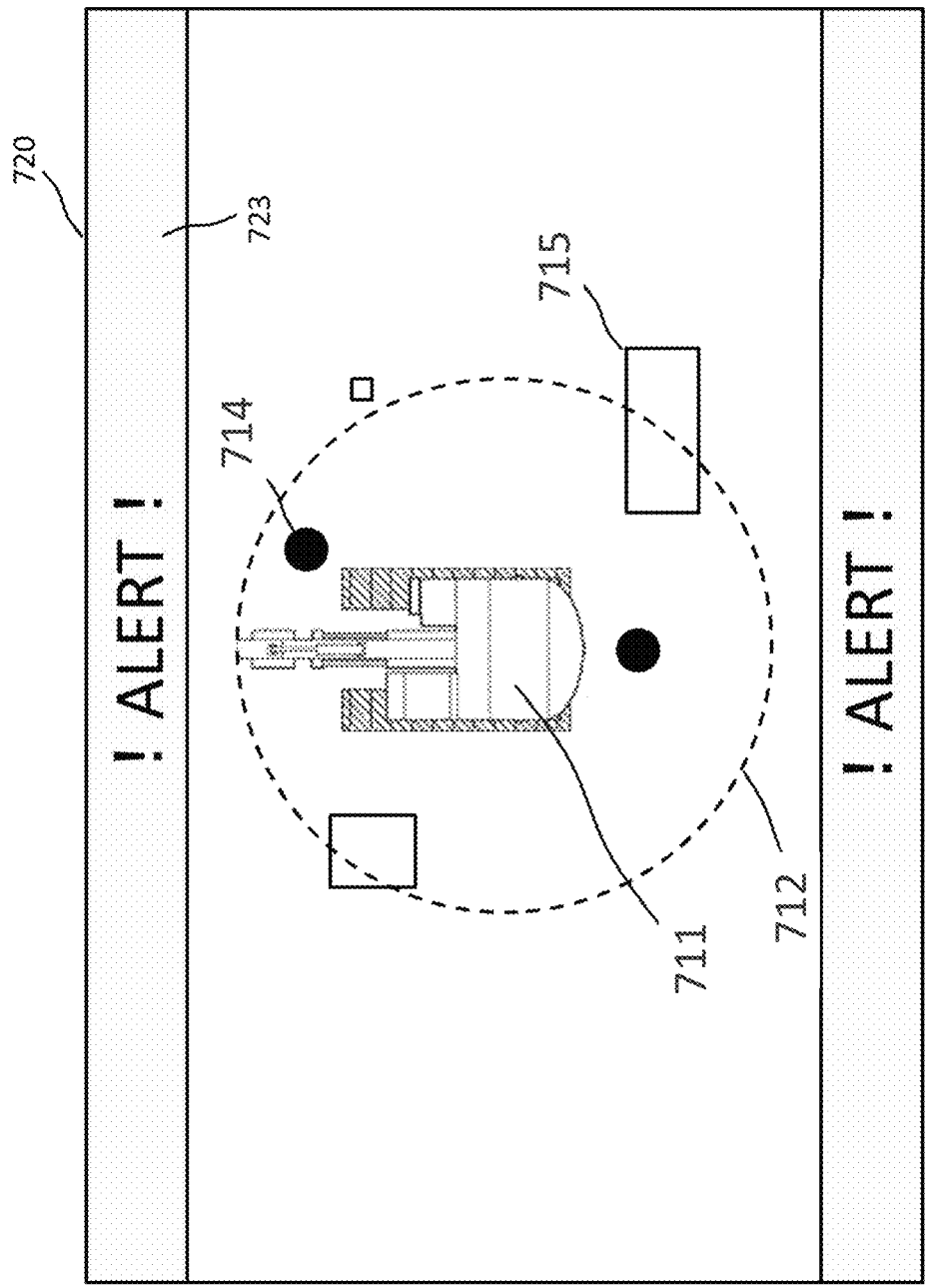
FIG. 17 is a view showing an example of a warning screen of warning level 2.

In case of warning level 2, the warning output section 700 has the display device 10a show highlighting with a warning mark 723 in addition to the display screen 710 of the display device 10a for warning level 1. FIG. 17 is a view showing an example of the warning screen of this display. The warning mark 723 is a band displayed on each of upper and lower sides of a screen 720 in a warning color such as red. Characters "ALERT" are shown on the band.

In case of warning level 3, a relatively small warning sound in comparison with that of warning levels 4 and 5 is output from the audio output device 10b in addition to the display screen 720 for warning level 2 to attract a gaze at the display screen by the operator using the warning sound.

In case of warning level 4, a relatively large warning sound in comparison with that of warning level 3 is output from the audio output device 10b in addition to the display screen 720 for warning level 2 to issue an intensive warning to the operator about a dangerous state.

In case of warning level 5, a machine body operation stop signal is generated in addition to the warning with display and sound for warning level 4. The determined warning contents are output to the warning output device 10 provided inside the seat in the cab, while the machine body operation stop signal is output to the machine body control device 20. In this manner, the respective devices 10a and 10b issue a warning or perform machine body operation stop control. For example, a hydraulic excavator changes a pilot pressure in accordance with operation of the operation lever 26 by the operator controls flow rates of hydraulic fluid for driving the respective actuators of the boom cylinder 3a, the arm cylinder 3b, the bucket cylinder 3c, the swing motor 3d, and the left and right traveling motors 3e and 3f. When the machine body operation stop signal is input, the machine body control device 20 closes the lock valve 39 and cuts off supply of hydraulic fluid from the gear pump 24 to the operation lever 26 to invalidate lever operation and stop the machine body.

The warning level of the present document described above is set such that a larger number of warning elements such as image, character, and sound are added as the levels are higher. The operator therefore can easily recognize the obstacle based on the warning level.

After the warning corresponding to the warning level is output to the warning output device 10, a series of process steps end.

[Operations•Effects]

According to the hydraulic excavator structured as described above, the blind angle calculation section 500 calculates the blind angle area and the viewable area of the operator from the cab 1f of the hydraulic excavator while considering information acquired from the mechanical state acquisition section 400 about the posture and operation of the hydraulic excavator. In the present embodiment, the three patterns A, B, and C are established as the blind angle area selected in accordance with the operation of the hydraulic excavator and the use or non-use of the vision assist device. The visibility level determination section 300 gives any one of levels 1 to 3 as the visibility level for each obstacle in accordance with whether or not the obstacle is present within the blind angle area calculated by the blind angle calculation section 500, and whether or not the obstacle is present within the central visual field of the operator. Subsequently, the warning level determination section 600 adjusts the warning level considering the visibility level given by the visibility level determination section 300. More specifically, in case of level 1 as the visibility level, one level is added to the initial warning level (warning level before adjustment). In case of level 2 as the visibility level, the initial warning level is maintained. In case of level 3 as the visibility level, one level is subtracted from the initial warning level. The warning level determined in this manner reflects whether or not the operator can visually recognize the obstacle. Accordingly, output of an appropriate warning to the operator is achievable.

When the warning level before adjustment is level 3 (when process flows through step 608 in FIG. 14), a warning is output from the audio output device 10b in addition to warning display in FIG. 17 shown on the display device 10a based on the warning level before adjustment. However, when the visibility level determined by the visibility level determination section 300 is level 3 (i.e., when it is determined that the operator recognizes the target obstacle which is present within the viewable area and in the central visual field (when process passes through step 305 in FIG. 13)), the warning level is adjusted into level 2 by subtracting one level. In this manner, output of a warning sound from the audio output device 10b is omitted, wherefore a warning sound is prevented from bothering the operator when the obstacle is visually recognized. In other words, only an appropriate warning is issued with reduction of excessive warning. Accordingly, lowering of work efficiency is avoidable by reduction of stress caused by excessive warning.

Moreover, the previous warning level is maintained even in the presence of the obstacle in the viewable area (when process passes through step 304 to step 306 in FIG. 13) in consideration that visibility in case of visual recognition of the obstacle using the vision assist device such as the back monitor 11 and the side mirror 15 becomes lower than visibility with naked eyes. In this case, the warning contributes to recovery of lowering of visibility in the indirect visual field, keeping an appropriate level without insufficiency.

On the other hand, when the obstacle is present in a blind angle area such as at the rear of the front work device 1A, the visibility level is set to level 1. In this case, the warning level is raised by one level from the level before adjustment. Accordingly, when the obstacle is present at a place not visually recognizable in view of the posture and operation of the hydraulic excavator, a warning contributes to easy recognition of the obstacle.

Embodiment 2

Figure 18:
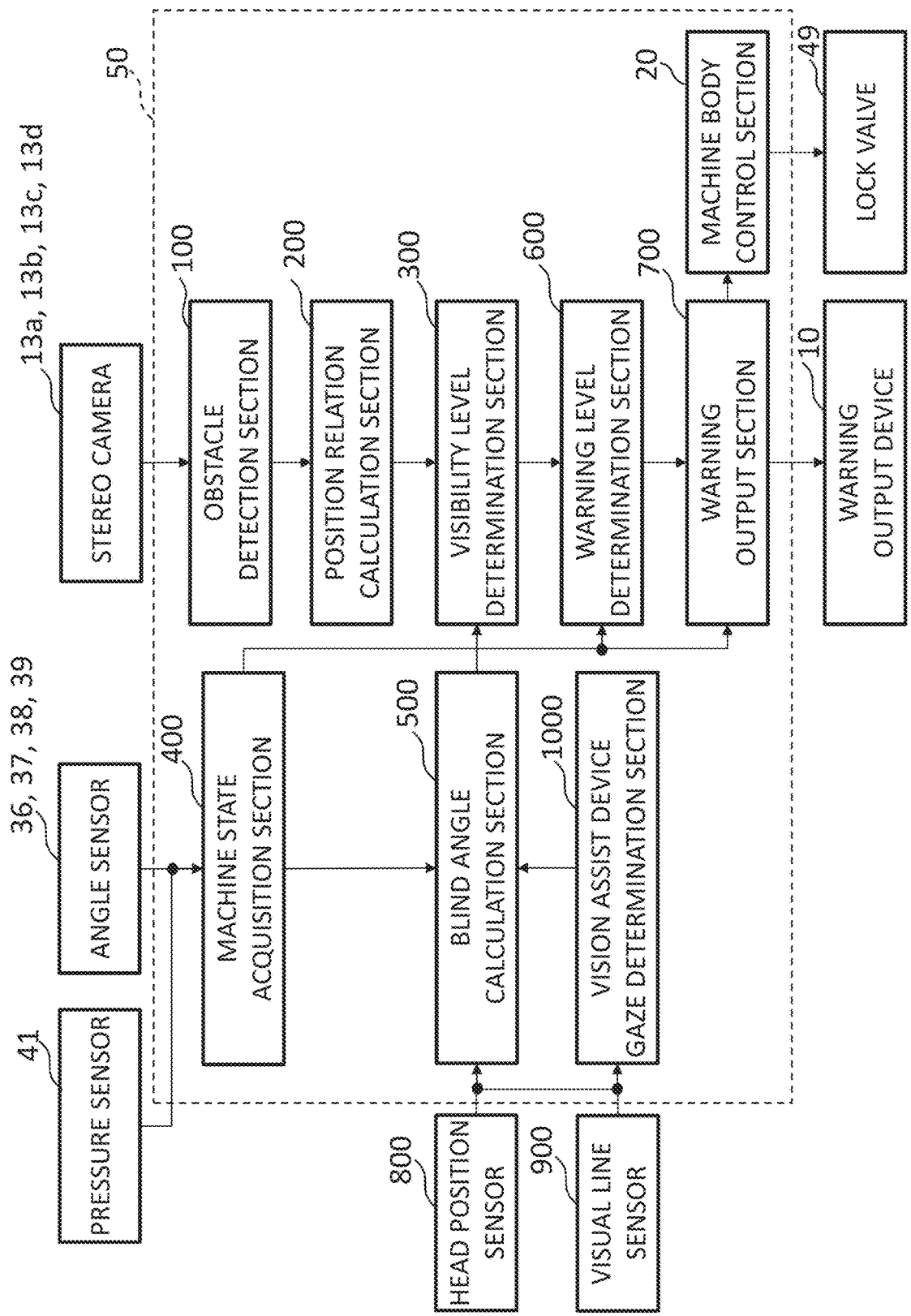
FIG. 18 is a function block diagram of the controller 50 according to Embodiment 2.

Embodiment 2 of the present invention will be next described.
[Structure]
FIG. 18 is a function block diagram of the controller 50 according to Embodiment 2. Chief differences from Embodiment 1 are that a head position sensor 800 and a visual line sensor 900 are provided as components of hardware, that a plurality of vision assist devices, i.e., the back monitor 11 (first vision assist device) and the side mirror 15 (see FIG. 12) (second vision assist device) are provided, and that a vision assist device gaze determination section 1000 is provided within the controller 50. The points different from Embodiment 1 are hereinafter chiefly described. Parts not touched upon herein are identical to the corresponding parts in Embodiment 1.

The head position sensor 800 is a stereo camera provided inside the seat in the cab 1f to capture an image of the head of the operator. The head position sensor 800 extracts characteristic points of the head of the operator from an image acquired by the stereo camera, and calculates position coordinates and direction of the head in the machine body coordinate system based on a parallax image. Head position information obtained herein is output to the blind angle calculation section 500 and the vision assist device gaze determination section 1000 within the controller 50.

The visual line sensor 900 is an eye camera attached to the head of the operator. The visual line sensor 900 extracts characteristic points of pupil centers and inner corners of the eyes of the operator by image processing based on an image showing a periphery of the eyes of the operator and acquired by the eye camera to obtain relative positions of these centers and corners. Moreover, a vertical rotation angle and a horizontal rotation angle of the eyeball of each of the left and right eyes are calculated based on the relative positions of the pupil center and the inner corner to obtain a visual line vector (visual line direction) in an operator head coordinate system. The obtained visual line vector is output to the blind angle calculation section 500 and the vision assist device gaze determination section 1000.

The vision assist device gaze determination section 1000 converts the visual line vector of the operator in the head coordinate system obtained from the visual line sensor 900 into a visual line vector in the machine body coordinate system based on the position information indicating the head position and obtained from the head position sensor 800. The vision assist device gaze determination section 1000 retains position information regarding the stereo camera 13a (back monitor 11) and the side mirror 15 attached to the hydraulic excavator. The vision assist device gaze determination section 1000 compares the position of the vision assist device with the visual line vector of the operator to determine whether or not the operator is gazing at one of the two vision assist devices, and identify the vision assist device corresponding to the gaze target in case of gazing. The identified result is output to the blind angle calculation section 500.

Figure 19:
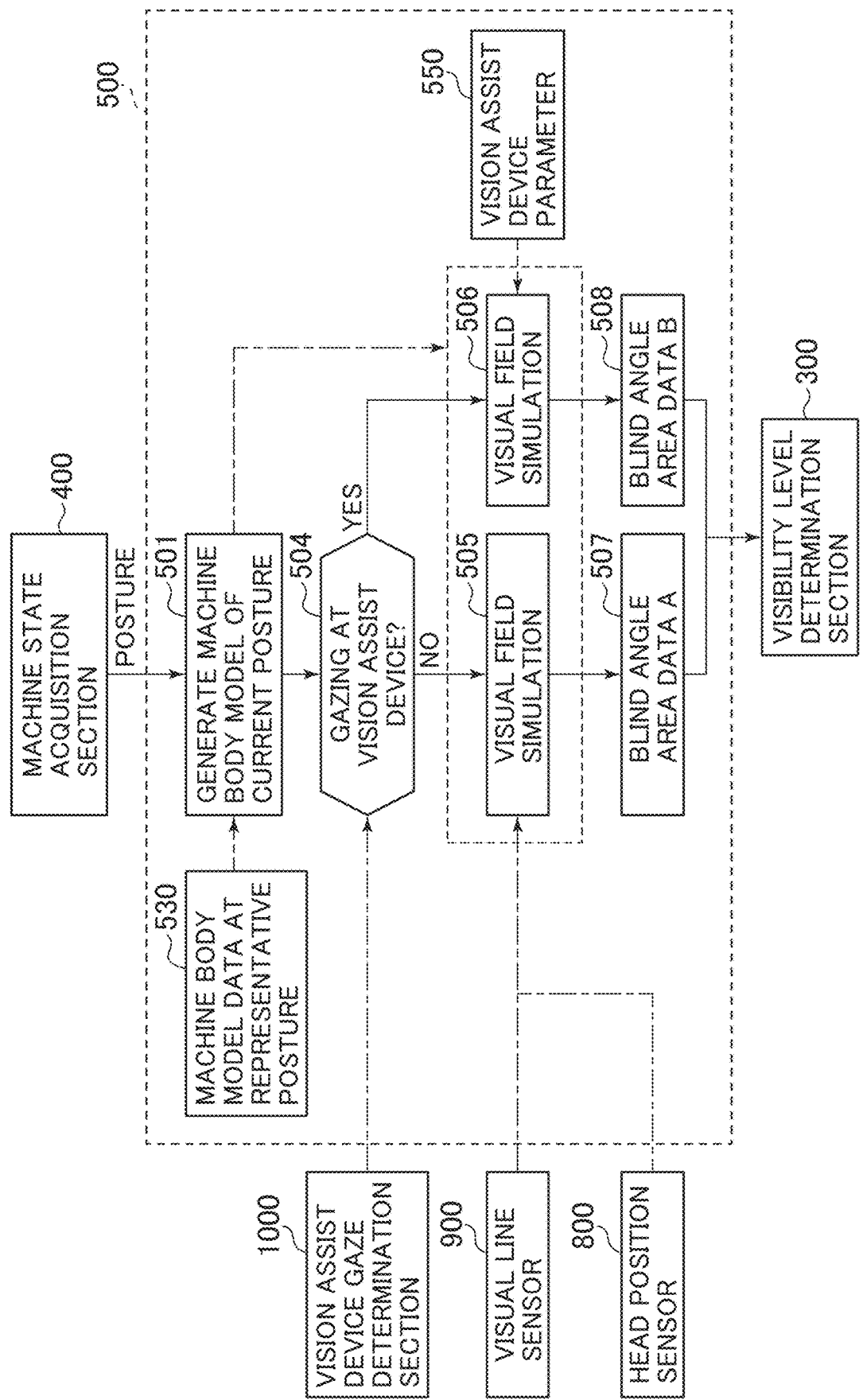
FIG. 19 is a chart showing a flow of process performed by the blind angle calculation section 500 according to Embodiment 2.

FIG. 19 is a chart showing a flow of a process performed by the blind angle calculation section 500 including the head position sensor 800, the visual line sensor 900, and the vision assist device gaze determination section 1000 according to the present embodiment.

In step 501, the blind angle calculation section 500 generates the machine body model at the current posture based on posture information of the machine body obtained from the mechanical state acquisition section 400, and the machine body model data 530.

In step 504, whether or not the operator is gazing at the vision assist device is determined based on input from the vision assist device gaze determination section 1000. When it is determined that the operator is not gazing at the vision assist device, the process proceeds to step 505. When it is determined that the operator is gazing at the vision assist device, the process proceeds to step 506.

In step 505, the blind angle calculation section 500 obtains a visual line vector of the operator in the machine body coordinate system based on input from the visual line sensor 900 and the head position sensor 800, and executes visual field simulation using the machine body model data reflecting the current posture to generate the blind angle area data A reflecting a blind angle produced by the front work device 1A.

In step 506, the blind angle calculation section 500 generates the blind angle area data B using information regarding which vision assist device of the back monitor 11 and the side mirror 15 the operator is gazing at, and the vision assist device parameter 550 associated with the vision assist device at which the operator is gazing currently (information regarding angle and attachment position and attachment angle of stereo camera 13a, visual field range and attachment position and attachment angle of side mirror 15, or others).

Figure 12:
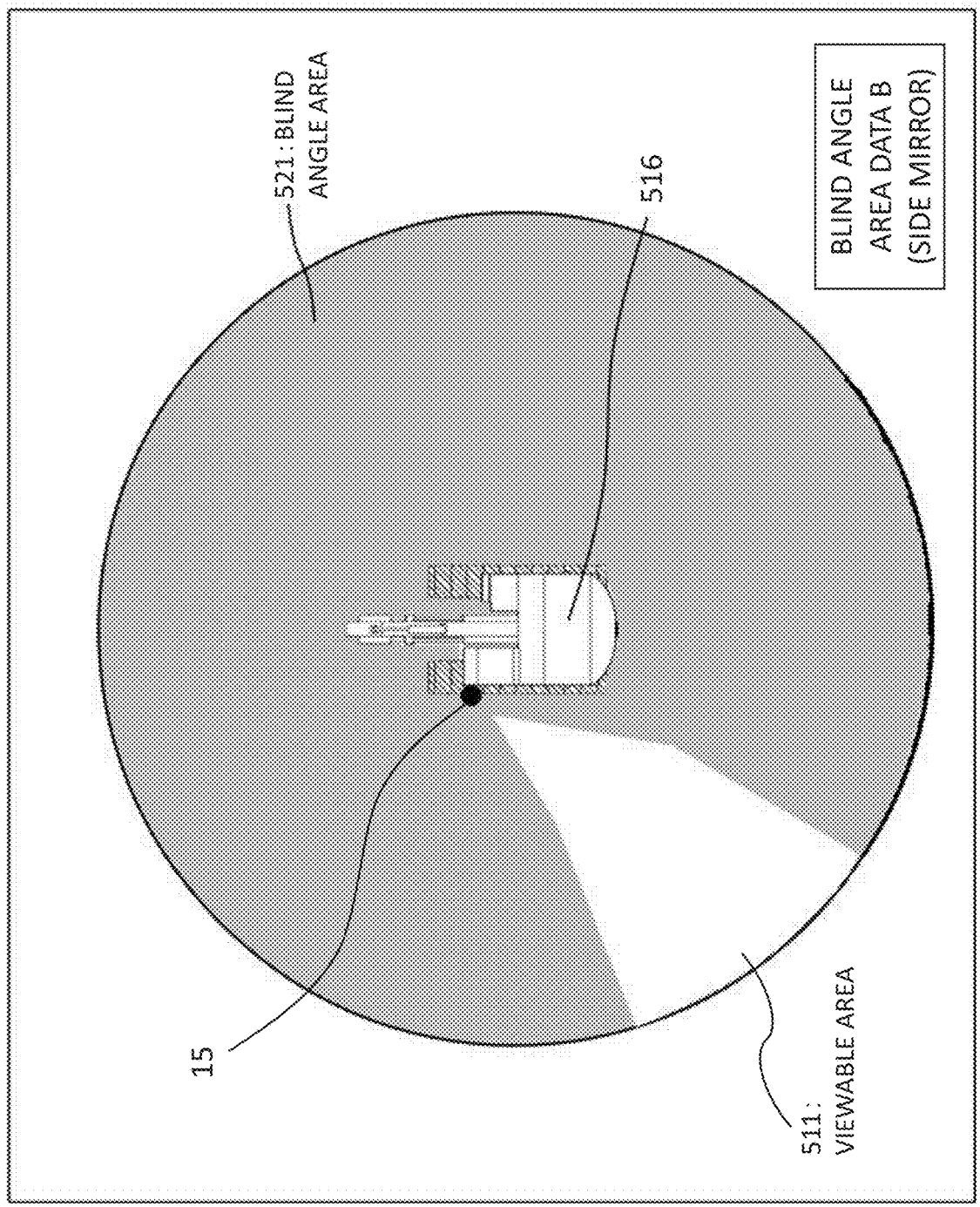
FIG. 12 is a view showing an example of the blind angle area data B when a side mirror is used as the vision assist device.

FIG. 12 is a view showing an example of the blind angle area data B when the side mirror 15 is used as the vision assist device. An area shown by the vision assist device as a gaze target is designated as the viewable area 511, while the other area is designated as the blind angle area 521. The blind angle area data B in case of a gaze at the back monitor 11 includes the viewable area 511 and the blind angle area 521 set in the manner of the example of FIG. 11.

The blind angle area data obtained in step 505 or step 506 is output to the visibility level determination section 300. Processing after the visibility level determination section 300 is similar to the corresponding processing in Embodiment 1.

Advantageous Effects

As described above, the hydraulic excavator including the head position sensor 800 and the visual line sensor 900 can specify a specific visual line direction of the operator. In this case, a gaze not only at the back monitor 11 but also at the side mirror 15 can be determined based on the visual line direction of the operator. Accordingly, the blind angle area data B is available as data reflecting an area shown on the side mirror 15. Moreover, the visual line direction of the operator can be accurately obtained without estimation of an operation of the hydraulic excavator based on detection values of the pilot pressure sensors 41. In this case, visual field simulation can be executed based on an actual gaze direction even in a state of no operation of the operation lever 26, or during traveling operation other than straight traveling. Accordingly, unlike Embodiment 1, the necessity of generating the blind angle area data C defining the entire periphery of the hydraulic excavator as a blind angle area is eliminated, wherefore further reduction of unnecessary warning and control is achievable.

<Characteristics>

In summary, the two embodiments described above have following characteristics.

(1) According to the above description, the periphery monitoring device of the work machine includes the controller 50 that includes: the obstacle detection section 100 that detects an obstacle present in the periphery of the work machine (hydraulic excavator); the position relation calculation section 200 that calculates the positional relationship between the obstacle detected by the obstacle detection section 100 and the work machine; the warning level determination section 600 that determines a warning level based on the positional relationship calculated by the position relation calculation section 200; and the warning output section 700 that outputs, to the warning output device 10, a warning content corresponding to the warning level determined by the warning level determination section 600. The controller 50 further includes: the mechanical state acquisition section 400 that acquires information regarding a posture and an operation of the work machine; the blind angle calculation section 500 that calculates a blind angle area from the seat in the cab 1f of the work machine based on the information indicating the posture and the operation of the work machine and acquired by the mechanical state acquisition section 400; and the visibility level determination section 300 that determines a visibility level of the obstacle based on the blind angle area calculated by the blind angle calculation section 500 and the positional relationship calculated by the position relation calculation section 200. The warning level determination section 600 adjusts the warning level in accordance with the visibility level determined by the visibility level determination section 300.

According to this structure, the warning level is adjusted in accordance with the visibility level determined by the visibility level determination section 300 based on the posture and operation of the work machine. Accordingly, an appropriate warning can be output in accordance with presence or absence of the obstacle in the blind angle area of the work machine.

(2) According to the periphery monitoring device of the work machine of (1) described above, the blind angle calculation section 500 estimates the visual line of the operator based on the operation of the work machine, and calculates the blind angle area based on the visual line and the posture of the work machine.

In this case, the visual line of the operator can be estimated by a simple structure. Accordingly, an appropriate blind angle area can be established based on a result of the estimation.

(3) According to the periphery monitoring device of the work machine of (1) described above, the periphery monitoring device further includes the head position sensor 800 that detects the head position of the operator of the work machine, and the visual line sensor 900 that detects the visual line of the operator. The blind angle calculation section 500 calculates the blind angle area based on the head position detected by the head position sensor 800, the visual line detected by the visual line sensor 900, and the posture of the work machine.

In this case, an accurate visual line of the operator can be acquired. Accordingly, an appropriate blind angle area can be established based on a result of the visual line.

(4) According to the periphery monitoring device of the work machine of either (2) or (3) described above, the periphery monitoring device further includes the vision assist device (back monitor, side mirror) 11, 15 that shows a predetermined area in the periphery of the hydraulic excavator. In a case of determination that the operator gazes at the vision assist device 11, 15 based on the visual line of the operator, the blind angle calculation section 500 calculates the blind angle area based on the area shown on the vision assist device 11, 15. In a case of determination that the operator does not gaze at the vision assist device 11, 15 based on the visual line of the operator, the blind angle calculation section 500 calculates the blind angle area based on the visual field of the operator.

In this case, a blind angle area different from a blind angle area set for the naked eyes is set for use of the blind angle assist device. Accordingly, appropriate setting of the visibility level, and therefore appropriate setting of the warning level are achievable.

(5) According to the periphery monitoring device of the work machine of either (2) or (3) described above, the visibility level determination section 300 determines the visibility level further based on the distance from the obstacle to the visual line of the operator.

According to this structure, the visibility level is set in accordance with the distance from the visual line. Accordingly, appropriate setting of the warning level is achievable.

(6) According to the periphery monitoring device of the work machine of (5) described above, a plurality of levels are established as the visibility level. The visibility level indicates that the operator of the work machine recognizes the obstacle with a higher possibility as the levels are higher. In a case where the obstacle is located in the blind angle area, the visibility level determination section 300 selects a first level as the visibility level. In a case where the obstacle is not located in the blind angle area and the visual line is not located within the predetermined distance D1 from the obstacle, the visibility level determination section 300 selects a second level higher than the first level as the visibility level. In a case where the obstacle is not located in the blind angle area and the visual line is located at the predetermined distance D1 or longer from the obstacle, the visibility level determination section 300 selects a third level higher than the second level as the visibility level. The warning level determination section 600 raises the warning level when the visibility level is the first level. The warning level determination section 600 maintains the warning level when the visibility level is the second level. The warning level determination section 600 lowers the warning level when the visibility level is the third level.

In this case, a warning similar to a warning issued when the obstacle is not visually recognized is not issued in a state that the obstacle is visually recognized with the visibility level set to the third level. Accordingly, the operator is not bothered by the warning. In other words, only appropriate warning is issued with reduction of excessive warning. Lowering of work efficiency is therefore avoidable by reduction of stress caused by excessive warning.

<Others>

The present invention is not limited to the embodiments described above, but includes various modified examples without departing from the scope of the subject matters of the present invention. For example, the present invention is not required to include all structures described in the above embodiments, but may eliminate a part of the structures. In addition, a part of a structure of a certain embodiment may be added to or replaced with a structure of a different embodiment.

While the visibility level determination section 300 of Embodiment 1 determines whether or not the obstacle is present in the central visual field in step 303, the processing in step 303 may be omitted. When step 303 is omitted, the subsequent step in case that the obstacle is not located at a blind angle in step 302 may be selected from either one of step 305 (visibility level 3) and step 306 (visibility level 2) in accordance with the actual situation at the work site or preferences of the operator.

Described in Embodiment 2 is an example which uses the side mirror 15 attached to the front left of the cab 1f as one of the vision assist devices in addition to the back monitor 11 showing an image acquired by the stereo camera 13a disposed at the rear. However, a mirror or a like instrument and device provided at a different place may be used as the vision assist device.

In the respective embodiments, when a plurality of obstacles are simultaneously detected, a warning at the highest warning level in the levels of the respective obstacles may be output from the warning output device 10.

While the obstacle and the distance from the obstacle are detected by using the stereo camera 13, a sensor having a function similar to the function of the stereo camera, such as a laser sensor and an ultrasonic sensor, may be used instead of the stereo camera. Alternatively, a plurality of types of sensors may be combined and used. For example, a monocular camera may be used for obstacle detection, while a laser sensor or an ultrasonic sensor may be used for detection of the distance from the obstacle.

While the hydraulic excavator is described above by way of example, the present invention is applicable to any types of work machine (e.g., wheel loader and crane) which includes a work device possibly interrupting the visual field of the operator from the cab.

A part or all of the respective structures associated with the controller 50, the functions and executed processes of the respective structures described above, and others may be implemented by hardware (e.g., by designing logic for executing respective functions using integrated circuits). The structure associated with the controller 50 described above may be a program (software) read and executed by using an arithmetic processing device (e.g., CPU) to implement respective functions associated with the structure of the controller 50. Information associated with the program may be stored in a semiconductor memory (e.g., flash memory, SSD), a magnetic storage device (e.g., hard disk drive), a recording medium (e.g., magnetic disk, optical disk), for example.

According to the foregoing description of the respective embodiments, control lines and information lines considered to be necessary for the description of the embodiments are shown. However, all control lines and information lines associated with a product are not necessarily presented herein. In practical situations, it may be considered that substantially all structures are mutually connected.

DESCRIPTION OF REFERENCE CHARACTERS

1A: Front work device
1B: Machine body
1a: Boom
1b: Arm
1c: Bucket
1d: Swing structure
1e: Track structure
1f: Cab
3a, 3b, 3c: Hydraulic actuator (hydraulic cylinder)
3e, 3f: Traveling motor
8a, 8b, 8c: Angle sensor
8e: Inclination angle sensor
41: Pilot pressure sensor
13a, 13b, 13c, 13d: Stereo camera (obstacle sensor)
10: Warning output device
11: Back monitor (vision assist device)
15: Side mirror (vision assist device)
20: Machine body control section
100: Obstacle detection section
200: Position relation calculation section
300: Visibility level determination section
400: Mechanical state acquisition section
500: Blind angle calculation section
600: Warning level determination section
700: Warning output section
710: Display screen example (warning level 1)
720: Display screen example (warning level 2 to 5)
800: Head position sensor
900: Visual line sensor
1000: Vision assist device gaze determination section

The invention claimed is:

1. A periphery monitoring device of a work machine, comprising:
a controller that includes:
an obstacle detection section that detects an obstacle present in a periphery of the work machine;
a position relation calculation section that calculates a positional relationship between the obstacle detected by the obstacle detection section and the work machine;
a warning level determination section that determines a warning level based on the positional relationship calculated by the position relation calculation section; and
a warning output section that outputs, to an output device, a warning content corresponding to the warning level determined by the warning level determination section, wherein
the controller further includes
a mechanical state acquisition section that acquires information regarding a posture and an operation of the work machine,
a blind angle calculation section that calculates a blind angle area from a seat in a cab of the work machine based on the information indicating the posture and the operation of the work machine and acquired by the mechanical state acquisition section, and
a visibility level determination section that determines a visibility level of the obstacle based on the blind angle area calculated by the blind angle calculation section and the positional relationship calculated by the position relation calculation section; and
the warning level determination section adjusts the warning level in accordance with the visibility level determined by the visibility level determination section.

2. The periphery monitoring device of the work machine according to claim 1, wherein
the blind angle calculation section estimates a visual line of an operator based on the operation of the work machine, and calculates the blind angle area based on the visual line and the posture of the work machine.

3. The periphery monitoring device of the work machine according to claim 1, further comprising:
a head position sensor that detects a head position of an operator of the work machine; and
a visual line sensor that detects a visual line of the operator, wherein
the blind angle calculation section calculates the blind angle area based on the head position detected by the head position sensor, the visual line detected by the visual line sensor, and the posture of the work machine.

4. The periphery monitoring device of the work machine according to claim 2, further comprising:
- a vision assist device that shows a predetermined area in the periphery of the work machine, wherein
- in a case of determination that the operator gazes at the vision assist device based on the visual line of the operator, the blind angle calculation section calculates the blind angle area based on the area shown on the vision assist device; and
- in a case of determination that the operator does not gaze at the vision assist device based on the visual line of the operator, the blind angle calculation section calculates the blind angle area based on a visual field of the operator.

5. The periphery monitoring device of the work machine according to claim 2, wherein
- the visibility level determination section determines the visibility level further based on a distance from the obstacle to the visual line.

6. The periphery monitoring device of the work machine according to claim 5, wherein
- a plurality of levels are established as the visibility level, and the visibility level indicates that the operator of the work machine recognizes the obstacle with a higher possibility as the levels are higher;
- in a case where the obstacle is located in the blind angle area, the visibility level determination section selects a first level as the visibility level, in a case where the obstacle is not located in the blind angle area and the visual line is not located within a predetermined distance from the obstacle, the visibility level determination section selects a second level higher than the first level as the visibility level, and in a case where the obstacle is not located in the blind angle area and the visual line is located at the predetermined distance or longer from the obstacle, the visibility level determination section selects a third level higher than the second level as the visibility level; and
- the warning level determination section raises the warning level when the visibility level is the first level, the warning level determination section maintains the warning level when the visibility level is the second level, and the warning level determination section lowers the warning level when the visibility level is the third level.

* * * * *